(12) United States Patent
Yoshida et al.

(10) Patent No.: US 12,210,317 B2
(45) Date of Patent: Jan. 28, 2025

(54) TONER, EXTERNAL ADDITIVE FOR TONER, AND FINE PARTICLE

(71) Applicant: CANON KABUSHIKI KAISHA, Tokyo (JP)

(72) Inventors: Sara Yoshida, Shizuoka (JP); Yusuke Kosaki, Shizuoka (JP); Taiji Katsura, Shizuoka (JP); Hidekazu Fumita, Shizuoka (JP); Kentaro Yamawaki, Shizuoka (JP); Itaru Kondo, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 673 days.

(21) Appl. No.: 17/496,859

(22) Filed: Oct. 8, 2021

(65) Prior Publication Data
US 2022/0121132 A1  Apr. 21, 2022

(30) Foreign Application Priority Data
Oct. 16, 2020 (JP) .................. 2020-175015

(51) Int. Cl.
| | |
|---|---|
| *G03G 9/097* | (2006.01) |
| *G03G 9/08* | (2006.01) |
| *G03G 9/087* | (2006.01) |
| *G03G 9/09* | (2006.01) |
| *C08G 77/00* | (2006.01) |

(52) U.S. Cl.
CPC ......... *G03G 9/0827* (2013.01); *G03G 9/0806* (2013.01); *G03G 9/0819* (2013.01); *G03G 9/0825* (2013.01); *G03G 9/08711* (2013.01); *G03G 9/08755* (2013.01); (Continued)

(58) Field of Classification Search
CPC ........... G03G 9/09783; G03G 9/09725; G03G 9/09708; G03G 9/0827
See application file for complete search history.

(56) References Cited

U.S. PATENT DOCUMENTS

| | | | |
|---|---|---|---|
| 4,952,476 A | 8/1990 | Sakashita et al. | |
| 4,957,840 A | 9/1990 | Sakashita et al. | |

(Continued)

FOREIGN PATENT DOCUMENTS

| | | |
|---|---|---|
| JP | 3943781 B2 | 7/2007 |
| JP | 5223382 B2 | 6/2013 |
| JP | 2017-138482 A | 8/2017 |

*Primary Examiner* — Peter L Vajda
(74) *Attorney, Agent, or Firm* — VENABLE LLP

(57) ABSTRACT

A toner including: a toner particle containing a binder resin and a colorant; and a fine particle on a surface of the toner particle, wherein the fine particle is a solid and substantially hemispherical shape, and has a substantially flat surface and a curved surface, and wherein a number-average value of a longest diameter "w" of the substantially flat surface is 10 to 400 nm. An external additive for a toner that is a solid and substantially hemispherical shape, and has a substantially flat surface and a curved surface, wherein a number-average value of a longest diameter "w" of the substantially flat surface is 10 to 400 nm. A fine particle that is a solid and substantially hemispherical shape, and has a substantially flat surface and a curved surface, wherein a number-average value of a longest diameter "w" of the substantially flat surface is 10 to 400 nm.

8 Claims, 6 Drawing Sheets

(52) U.S. Cl.
CPC ....... *G03G 9/0918* (2013.01); *G03G 9/09775* (2013.01); *C08G 77/70* (2013.01)

(56) References Cited

U.S. PATENT DOCUMENTS

| | | | |
|---|---|---|---|
| 4,985,327 A | 1/1991 | Sakashita et al. | |
| 5,014,089 A | 5/1991 | Sakashita et al. | |
| 5,202,213 A | 4/1993 | Nakahara et al. | |
| 5,532,101 A | 7/1996 | Nozawa et al. | |
| 5,534,982 A | 7/1996 | Sakaizawa et al. | |
| 5,731,122 A | 3/1998 | Yoshida et al. | |
| 5,774,771 A | 6/1998 | Kukimoto et al. | |
| 5,915,150 A | 6/1999 | Kukimoto et al. | |
| 5,948,584 A | 9/1999 | Hashimoto et al. | |
| 5,998,080 A | 12/1999 | Ohno et al. | |
| 6,177,223 B1 | 1/2001 | Hashimoto et al. | |
| 6,214,509 B1 | 4/2001 | Kasuya et al. | |
| 6,300,024 B1 | 10/2001 | Yusa et al. | |
| 6,337,169 B1 | 1/2002 | Hashimoto et al. | |
| 6,528,224 B2 | 3/2003 | Ohno et al. | |
| 6,627,374 B2 | 9/2003 | Fumita et al. | |
| 6,696,211 B2 | 2/2004 | Yoshida et al. | |
| 6,806,016 B2 | 10/2004 | Ohno et al. | |
| 6,835,521 B2 | 12/2004 | Tsuji et al. | |
| 7,611,816 B2 | 11/2009 | Tuji et al. | |
| 8,105,743 B2 | 1/2012 | Ishii | |
| 8,545,133 B2 | 10/2013 | Fumita et al. | |
| 8,916,319 B2 | 12/2014 | Ikeda et al. | |
| 8,940,467 B2 | 1/2015 | Hashimoto et al. | |
| 9,309,349 B2 | 4/2016 | Watanabe et al. | |
| 9,341,967 B2 | 5/2016 | Tsujino et al. | |
| 9,366,981 B2 | 6/2016 | Yamawaki et al. | |
| 9,429,860 B2 | 8/2016 | Kinumatsu et al. | |
| 9,632,441 B2 | 4/2017 | Abe et al. | |
| 9,658,554 B2 | 5/2017 | Kinumatsu et al. | |
| 9,720,340 B2 | 8/2017 | Tominaga et al. | |
| 9,733,583 B2 | 8/2017 | Kuroki et al. | |
| 9,798,256 B2 | 10/2017 | Kosaki et al. | |
| 9,798,262 B2 | 10/2017 | Toyoizumi et al. | |
| 9,811,016 B2 | 11/2017 | Aoki et al. | |
| 9,823,595 B2 | 11/2017 | Toyoizumi et al. | |
| 9,857,713 B2 | 1/2018 | Kosaki et al. | |
| 9,869,943 B2 | 1/2018 | Aoki et al. | |
| 9,897,933 B2 | 2/2018 | Yoshida et al. | |
| 10,054,866 B2 | 8/2018 | Tanaka et al. | |
| 10,114,303 B2 | 10/2018 | Katsura et al. | |
| 10,295,920 B2 | 5/2019 | Nishikawa et al. | |
| 10,303,074 B2 | 5/2019 | Yamawaki et al. | |
| 10,303,075 B2 | 5/2019 | Tanaka et al. | |
| 10,409,180 B2 | 9/2019 | Koji et al. | |
| 10,429,757 B2 | 10/2019 | Yoshida et al. | |
| 10,503,090 B2 | 12/2019 | Tominaga et al. | |
| 10,539,893 B2 | 1/2020 | Tanaka et al. | |
| 10,539,899 B2 | 1/2020 | Nakamura et al. | |
| 10,545,422 B2 | 1/2020 | Yamawaki et al. | |
| 10,635,010 B2 | 4/2020 | Kamikura et al. | |
| 10,635,011 B2 | 4/2020 | Umeda et al. | |
| 10,809,639 B2 | 10/2020 | Yamawaki et al. | |
| 10,942,465 B2 | 3/2021 | Kototani et al. | |
| 10,942,466 B2 | 3/2021 | Tominaga et al. | |
| 10,976,678 B2 | 4/2021 | Yamawaki et al. | |
| 10,976,679 B2 | 4/2021 | Tanaka et al. | |
| 11,003,104 B2 | 5/2021 | Katsura et al. | |
| 11,003,105 B2 | 5/2021 | Sato et al. | |
| 11,112,712 B2 | 9/2021 | Matsunaga et al. | |
| 11,169,460 B2 | 11/2021 | Kototani et al. | |
| 2001/0018158 A1 | 8/2001 | Yoshida et al. | |
| 2008/0226998 A1* | 9/2008 | Ishii | G03G 9/09725 430/48 |
| 2015/0248072 A1 | 9/2015 | Katsuta et al. | |
| 2021/0003932 A1 | 1/2021 | Tsuda et al. | |
| 2021/0003934 A1 | 1/2021 | Fumita et al. | |
| 2021/0397110 A1 | 12/2021 | Katsura et al. | |

\* cited by examiner

0°   90°   180°   270°

TONER, EXTERNAL ADDITIVE FOR TONER, AND FINE PARTICLE

BACKGROUND OF THE INVENTION

Field of the Invention

The present invention relates to a toner for developing an electrostatic image to be used in image-forming methods, such as electrophotography and electrostatic printing, an external additive for a toner, and a fine particle.

Description of the Related Art

A typical apparatus adopting an electrophotographic system in which a toner is used is, for example, a laser printer or a copying machine. In recent years, a reduction in power consumption of such apparatus, the downsizing thereof, and an improvement in image quality thereof have been further required, and hence various investigations have been made with a view to developing an excellent toner for satisfying the requirements.

Of the investigations, an approach including externally adding various fine particles to the surface of a toner particle in a toner has been widely known. In Japanese Patent Application Laid-Open No. 2017-138482, there is a proposal of a toner excellent in transferability and cleaning property, which is obtained by externally adding a fine particle having a specific size, a specific aspect ratio, and a specific shape to a toner particle having a high circularity. However, the migration of the external additive from the surface of the toner particle to any other member along with continuous use of the toner, and the rolling and embedment of the external additive on the surface of the toner particle have remained as problems. In particular, in such a design performed in recent years that the amount of a toner to be loaded into a cartridge is reduced to the extent possible so that the toner may be used up at the time point of the exchange of the cartridge, the toner repeatedly receives a mechanical stress, and hence the problems become truly remarkable.

In view of the foregoing, in Japanese Patent No. 5223382, there is a proposal of an approach to suppressing the elimination of an external additive from the surface of the particle of a toner and the rolling of the external additive on the surface of the toner particle through use of a hemispherical and large-particle diameter fine particle as the external additive in the toner. However, a hollow and hemispherical organic fine particle is produced by bursting a hollow organic fine particle to remove a gas therein. Accordingly, under such a condition that a strong external force is applied to the fine particle, a reduction in function of the toner due to the breaking of the fine particle itself becomes a problem. In addition, the fine particle has such a shape that air is held in the hemisphere, and hence the low-temperature fixability of the toner has involved a problem owing to the heat-insulating effect of the air.

In addition, in Japanese Patent No. 3943781, there is a disclosure of an approach to obtaining a toner excellent in development transferability even after its long-term use through the formation of the covering layer of a silicon compound on the surface of a toner particle. However, it has been impossible to ignore the inhibition of the fixability of the toner by a high coverage of the surface of the toner particle as compared to a fine particle external additive.

SUMMARY OF THE INVENTION

An object of the present invention is to provide a toner that is excellent in low-temperature fixability and can maintain its initial cleaning property even after having continuously received a mechanical stress, an external additive for a toner, and a fine particle.

The present invention relates to a toner including: a toner particle containing a binder resin and a colorant; and a fine particle on a surface of the toner particle, wherein the fine particle is a solid and substantially hemispherical shape, and has a substantially flat surface and a curved surface, and wherein a number-average value of a longest diameter "w" of the substantially flat surface is 10 to 400 nm.

The present invention also relates to an external additive for a toner that is a solid and substantially hemispherical shape, and has a substantially flat surface and a curved surface, a number-average value of a longest diameter "w" of the substantially flat surface from 10 to 400 nm.

The present invention also relates to a fine particle that is a solid and substantially hemispherical shape, and has a substantially flat surface and a curved surface, a number-average value of a longest diameter "w" of the substantially flat surface being 10 to 400 nm.

Further features of the present invention will become apparent from the following description of exemplary embodiments with reference to the attached drawings.

DESCRIPTION OF THE EMBODIMENTS

Figure 1:
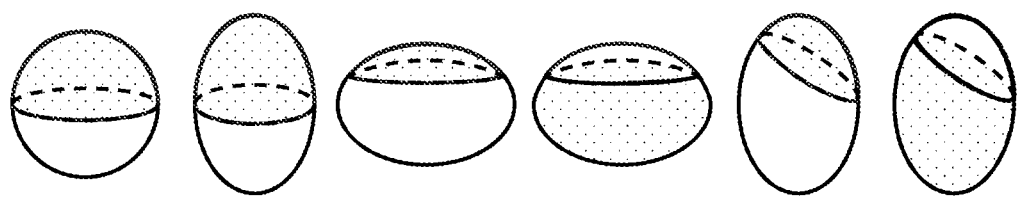
FIG. 1 is a view for illustrating examples of a substantially hemispherical shape.

Preferred embodiments of the present invention will now be described in detail in accordance with the accompanying drawings.

In the present invention, the description "∘∘ to xx" representing a numerical range means a numerical range including a lower limit and an upper limit that are end points unless otherwise stated.

The present invention relates to a toner including: a toner particle containing a binder resin and a colorant; and a fine particle on a surface of the toner particle, wherein the fine particle is a solid and substantially hemispherical shape, and has a substantially flat surface and a curved surface, and wherein a number-average value of a longest diameter "w" of the substantially flat surface is 10 to 400 nm.

The present invention also relates to an external additive for a toner that is a solid and substantially hemispherical shape, and has a substantially flat surface and a curved surface, a number-average value of a longest diameter "w" of the substantially flat surface being 10 to 400 nm.

The present invention also relates to a fine particle that is a solid and substantially hemispherical shape, and has a substantially flat surface and a curved surface, a number-average value of a longest diameter "w" of the substantially flat surface being 10 to 400 nm.

It is essential that the toner of the present invention include the fine particle on the surface of the toner particle containing the binder resin and the colorant, and the fine particle be a solid and substantially hemispherical shape.

In addition, it is essential that the external additive for a toner of the present invention be a solid and substantially hemispherical shape.

In addition, it is essential that the fine particle of the present invention be a solid and substantially hemispherical shape.

The term "solid" as used herein refers to a state in which the inside of a fine particle is filled with a solid, and is hence not hollow. The state in which the inside of the fine particle is filled with the solid, and is hence not hollow can be recognized by observing a section of the fine particle.

When the fine particle is solid, even in the case where the fine particle present on the surface of the toner particle continuously receives a mechanical stress, the fine particle can be present on the surface of the toner particle without breaking its substantially hemispherical shape. Herein, a typical example of the case where the fine particle continuously receives the mechanical stress is a case in which such a design that the amount of the toner to be loaded into a cartridge is reduced to the extent possible so that the toner may be used up at the time point of the exchange of the cartridge (hereinafter referred to as "toner use-up design") is adopted. In the toner use-up design, under a state in which the amount of the toner in the toner cartridge is small, that is, at the timing at which the exchange of the cartridge is drawing near, the frequency at which a cycle in which the same toner particle is subjected to development and returns to the cartridge without being developed is repeated increases. Accordingly, the toner repeatedly receives the mechanical stress. Even under such state, as long as the fine particle is solid, the fine particle can be present on the surface of the toner particle without breaking its substantially hemispherical shape, and hence the maintenance of the initial cleaning property of the toner that is one effect of the present invention can be achieved.

In addition, when the fine particle is solid, no air is present in the fine particle, and hence heat conduction at the time of the fixation of the toner is not inhibited by the heat-insulating effect of air. As is generally known, while the thermal conductivity of the air is 0.023 [W/(m·K)], for example, the thermal conductivity of a silicone resin is 0.13 to 0.14 [W/(m·K)], and the thermal conductivity of silica is 1.38 [W/(m·K)]. Accordingly, when the fine particle is present on the surface of the toner particle, heat is transferred faster in a solid fine particle having filled therein a solid than in a hollow fine particle. As a result, the fine particle exhibits an effect on the low-temperature fixability of the toner.

In addition, in the present invention, it is required that the fine particle present on the surface of the toner particle be a substantially hemispherical shape, and have a substantially flat surface and a curved surface.

Further, in another aspect of the present invention, it is required that the external additive for a toner be a substantially hemispherical shape, and have a substantially flat surface and a curved surface.

Still further, in another aspect of the present invention, it is required that the fine particle be a substantially hemispherical shape, and have a substantially flat surface and a curved surface.

When the fine particle or the external additive for a toner is a substantially hemispherical shape, and has a substantially flat surface and a curved surface, the fine particle or the external additive for a toner sticks to the surface of the toner particle so that the substantially flat surface of the fine particle or the external additive for a toner and the surface of the toner particle may be brought into contact with each other. Accordingly, the migration of the fine particle or the external additive for a toner the surface of the toner particle, and the rolling thereof on the surface of the toner particle are suppressed. As a result, even when the fine particle or the external additive for a toner present on the surface of the toner particle repeatedly receives a mechanical stress, the initial cleaning property of the toner can be maintained.

In addition, when the fine particle or the external additive for a toner is a substantially hemispherical shape, and has a substantially flat surface and a curved surface, the curved surface of the fine particle or the external additive for a toner that has stuck to the surface of the toner particle serves as a surface to be brought into abutment with a member. Accordingly, the area of contact between the member and the toner particle reduces, and hence an adhesive force therebetween can be kept minimum. As an example, when the member is a photosensitive drum, a reduction in adhesive force between the photosensitive drum and the toner particle improves the transferability of the toner. As a result, the amount of a transfer residual toner is reduced, and hence an improving effect on the initial cleaning property thereof can be expressed.

The term "substantially hemispherical shape" as used herein refers to a shape obtained by cutting an ellipsoid along an arbitrary surface thereof. As illustrated in FIG. 1, when the ellipsoid is divided into two three-dimensional objects along the arbitrary surface, one of the three-dimensional objects (in FIG. 1, a three-dimensional object represented by a dot pattern) is an example of the substantially hemispherical shape in the present invention. In the present invention, the ellipsoid includes a true sphere and a three-dimensional object to be approximated to an ellipsoid, and the arbitrary surface may or may not pass through the center of the ellipsoid. A method of manufacturing the fine particle or the external additive for a toner of a substantially hemispherical shape herein is not limited only to a method including cutting the ellipsoid, and includes, for example, a method including forming the fine particle or the external additive on a substrate having a substantially flat surface in a bottom-up manner. In the case of the method including forming the fine particle or the external additive on the substrate having a substantially flat surface in a bottom-up manner, when a particle having a surface which is substantially flat and having a particle diameter several tens of times as large as the size of the fine particle or the external additive for a toner is used as the substrate, the fine particle or the external additive for a toner of a substantially hemispherical shape having a substantially flat surface and a curved surface can be easily manufactured.

Figure 2A:
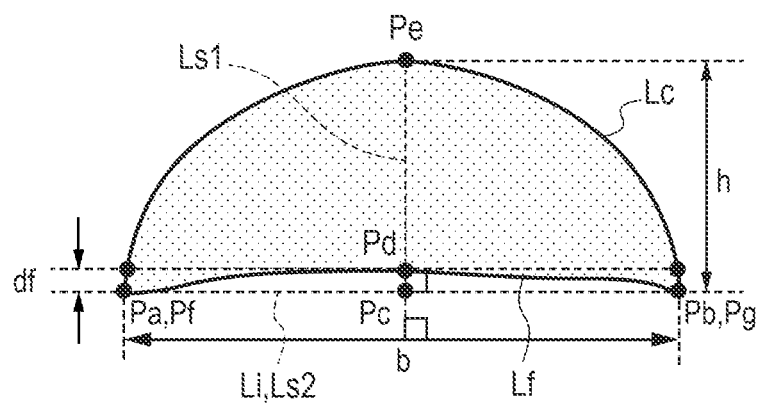
FIG. 2A, FIG. 2B, FIG. 2C, and FIG. 2D are views for illustrating examples of a maximum length df, a maximum height "h", and a maximum width "b" when a section of a fine particle or an external additive for a toner of a substantially hemispherical shape is observed.
Figure 2B:
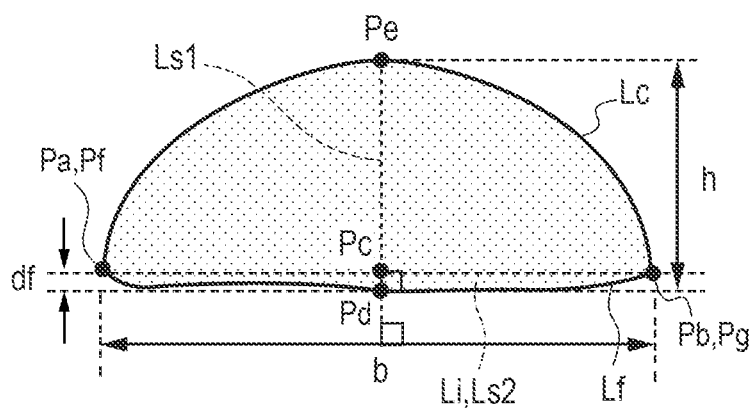
Figure 2C:
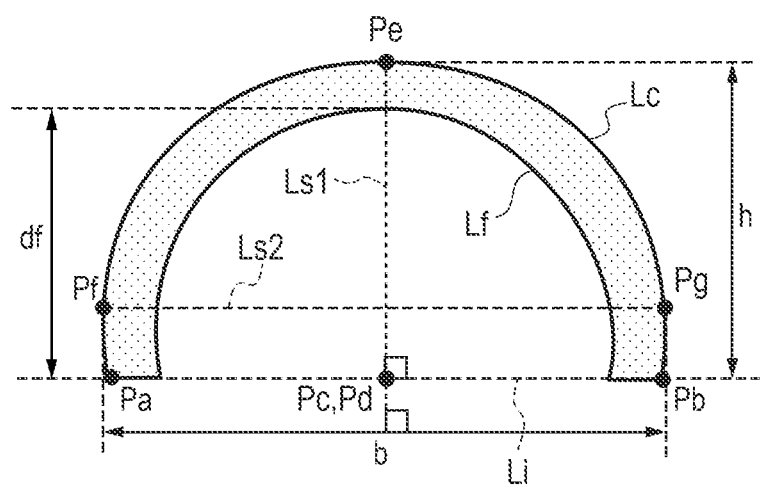
Figure 2D:
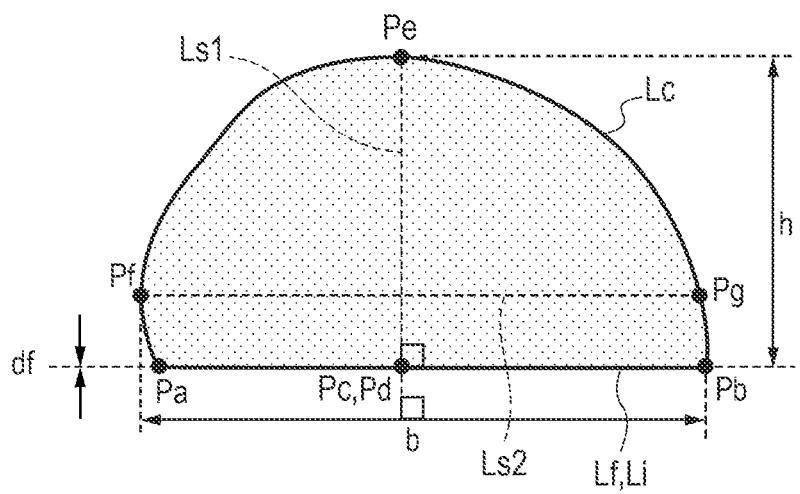
Figure 2E:
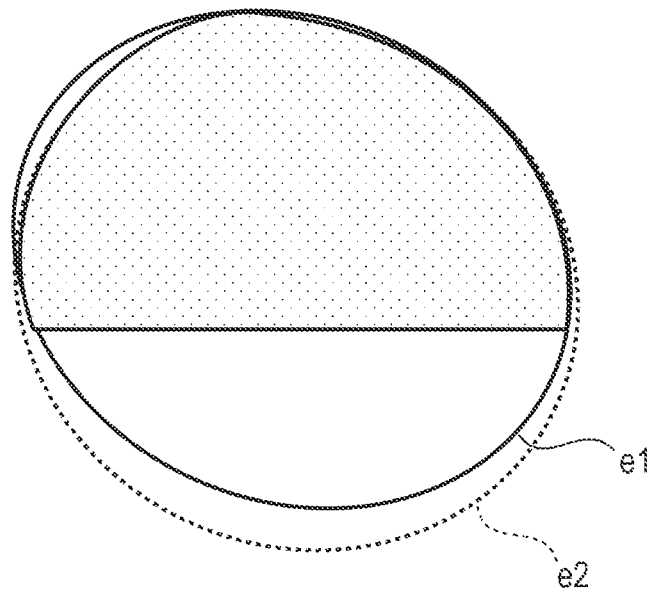
FIG. 2E, FIG. 2F, FIG. 2E', and FIG. 2F' are views for illustrating examples of the long axis l1 of an ellipse e1, the long axis l2 of an ellipse e2, the short axis s1 of the ellipse e1, and the short axis s2 of the ellipse e2 when the section of the fine particle or the external additive for a toner of a substantially hemispherical shape is observed.
Figure 2F:
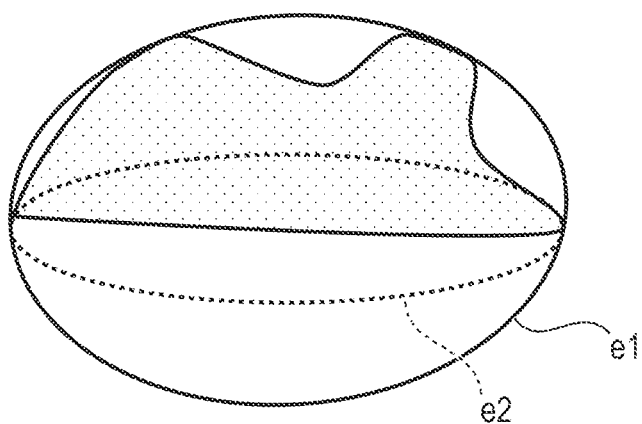
Figure 2E:
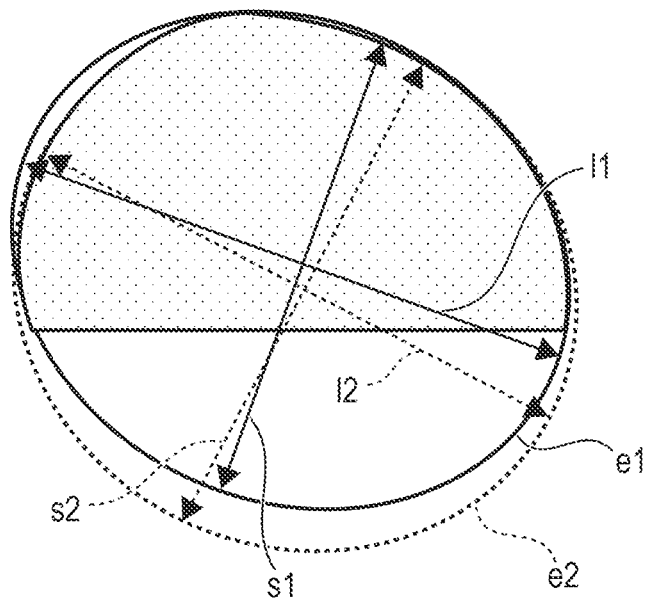
Figure 2F:
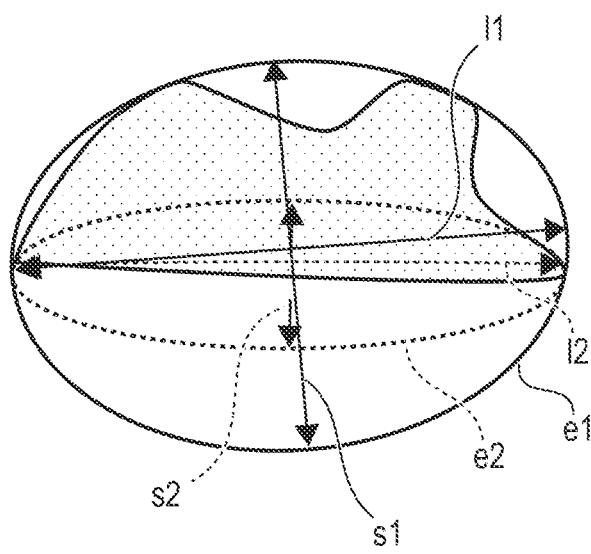

The fact that the fine particle or the external additive for a toner is a substantially hemispherical shape can be recognized by observing a section intersecting the substantially flat surface of the fine particle or the external additive for a toner. Specifically, when the following two points are satisfied at the time of the observation of a section of the fine particle or the external additive for a toner, the fine particle or the external additive is judged to be a substantially hemispherical shape: (1) when, in the section intersecting the substantially flat surface of the fine particle or the external additive for a toner, a straight line that connects two points of Pa and Pb of intersections of a line Lf and a line Lc is defined as an imaginary straight line Li, the line Lf being derived from the substantially flat surface, and the line Lc being derived from the curved surface, and the longest distance between the imaginary straight line Li and the line Lf derived from the substantially flat surface is defined as a maximum length df, and in a straight line Ls1 vertically intersecting the imaginary straight line Li on the section, such a distance that one of distances Da and db that becomes maximum is defined as a maximum height "h", the distance Da being a distance between a point Pc and a point Pe, the point Pc being a point of intersection of the imaginary straight line Li and the straight line Ls1, and the point Pe being a point of intersection of the line Lc derived from the curved surface and the straight line Ls 1, the distance db being a distance between a point Pd and the point Pe, and the point Pd being a point of intersection of the line Lf derived from the substantially flat surface and the straight line Ls1, the point Pe being a point of intersection of the line Lc derived from the curved surface and the straight line Ls1, the number-average value of the ratio df/h of the maximum length df to the maximum height "h" is 0.00 to 0.10; and (2) when, in the section intersecting the substantially flat surface of the fine particle or the external additive for a toner, an ellipse that passes through the two points of intersection of the substantially flat surface and the curved surface, and is circumscribed on the curved surface of the fine particle or the external additive for a toner is represented by e1, and an ellipse that passes through the two points of intersection of the substantially flat surface and the curved surface, and is inscribed on the curved surface of the fine particle or the external additive for a toner is represented by e2, the number-average value of the ratio l1/l2 of the long axis l1 of the ellipse e1 to the long axis l2 of the ellipse e2 is 0.90 to 1.10, and the number-average value of the ratio s1/s2 of the short axis s1 of the ellipse e1 to the short axis s2 of the ellipse e2 is 0.90 to 1.10. Examples of the maximum length df and the maximum height "h" are illustrated in FIG. 2A to FIG. 2D. The number-average value of the ratio df/h is preferably 0.00 to 0.05 because the fine particle or the external additive for a toner more strongly sticks to the surface of the toner particle, and hence a cleaning property after the toner has continuously received a mechanical stress is improved. In addition, examples of the ellipse e1, the ellipse e2, the long axis l1 of the ellipse e1, the long axis l2 of the ellipse e2, the short axis s1 of the ellipse e1, and the short axis s2 of the ellipse e2 are illustrated in FIG. 2E to FIG. 2F'.

In addition, in the toner of the present invention, the fine particle present on the surface of the toner particle has a substantially flat surface and a curved surface, and the number-average value of the longest diameter "w" of the substantially flat surface is 10 to 400 nm.

Further, in another aspect of the present invention, the external additive for a toner has a substantially flat surface and a curved surface, and the number-average value of the longest diameter "w" of the substantially flat surface is 10 to 400 nm.

Still further, in another aspect of the present invention, the fine particle has a substantially flat surface and a curved surface, and the number-average value of the longest diameter "w" of the substantially flat surface is 10 to 400 nm.

Figure 3:
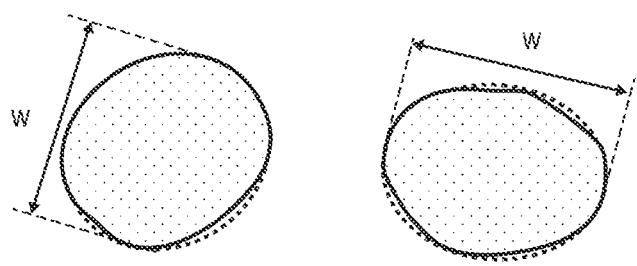
FIG. 3 is a view for illustrating examples of a longest diameter "w" when the fine particle or the external additive for a toner of a substantially hemispherical shape is observed from an arbitrary one direction.

The longest diameter "w" of the substantially flat surface of the fine particle or the external additive for a toner is calculated as follows: the fine particle or the external additive for a toner is observed from an upper direction (direction in which the substantially flat surface of the fine particle or the external additive for a toner can be observed), and the distance of the longest straight line out of straight lines each connecting arbitrary two points present on the outer periphery of the substantially flat surface is adopted as the longest diameter. Examples of the longest diameter "w" are illustrated in FIG. 3.

When the number-average value of the longest diameter "w" of the substantially flat surface of the fine particle or the external additive for a toner is 10 to 400 nm, the initial cleaning property and low-temperature fixability of the toner become satisfactory. When the number-average value of the longest diameter "w" is 10 nm or more, the probability that not the surface of the toner particle but the fine particle or the external additive for a toner present on the surface of the toner particle is brought into abutment with the member increases. Accordingly, when the number-average value of the longest diameter "w" is 10 nm or more, the adhesive force of the toner particle to the member can be kept small. As a result, the amount of the transfer residual toner reduces, thereby exhibiting an advantageous effect on the initial cleaning property. When the number-average value of the longest diameter "w" is 30 nm or more, preferably 50 nm or more, a further effect on the initial cleaning property is exhibited. In addition, when the number-average value of the longest diameter "w" is 400 nm or less, the area of the surface of the toner particle to be covered with one fine particle or one particle of the external additive for a toner can be suppressed from becoming excessively large, and hence an advantageous effect on the low-temperature fixability of the toner is obtained. A case in which the number-average value of the longest diameter "w" is 300 nm or less, preferably 250 nm or less is more effective for the low-temperature fixability of the toner.

The shape of the fine particle or the external additive for a toner, and the number-average value of the longest diameter "w" can be controlled by the kind and number of parts of a monomer used in the manufacture of the fine particle or the external additive for a toner, a reaction temperature, a reaction time, a reaction medium, and the pH of a reaction system at the time of the polymerization of the monomer, and the kind and concentration of a dispersant. In addition, when the fine particle or the external additive for a toner is manufactured by the method including forming the fine particle or the external additive on the substrate in a bottom-up manner, the shape of the fine particle or the external additive for a toner, and the number-average value of the longest diameter "w" can also be controlled by the shape and size of the substrate.

In the toner of the present invention, when the surfaces of the toner particles are observed, the substantially flat surfaces of the fine particles are preferably observed.

In the case where the substantially flat surfaces of the fine particles are observed at the time of the observation of the surfaces of the toner particles, part of the fine particles are brought into the state of being liable to migrate from the surfaces of the toner particles to the surface of the member. The fine particles that have migrated to the surface of the member stick to the surface of the member so that the substantially flat surfaces and the surface of the member may be brought into contact with each other. As an example, when the member is a cleaning blade, part of the fine particles that have migrated to the cleaning blade stick to the surface of the cleaning blade so that the substantially flat surfaces and the surface of the cleaning blade may be brought into contact with each other. Accordingly, the curved surfaces of the fine particles on the cleaning blade serve as surfaces to be brought into abutment with a photosensitive drum. As a result, torque at the time of the cleaning of the drum reduces, and hence the escape of the toner particles hardly occurs. Accordingly, the initial cleaning property is improved.

Because of the substantially hemispherical shape of the fine particle or external additive for a toner of the present invention, most of the fine particles or the particles of the external additive for a toner stick to the surfaces of the toner particles so that their substantially flat surfaces and the surfaces of the toner particles may be brought into contact with each other. Thus, the migration of the fine particles or the external additive from the surfaces of the toner particles is suppressed. However, the fine particle or the external additive for a toner migrating from the surface of each of the toner particles to the surface of the member exists because none of a network between the fine particles or the particles of the external additive for a toner, and a chemical bond between the fine particle or the external additive for a toner and the toner particle is present. The case where the substantially flat surfaces of the fine particles or the particles of the external additive for a toner are observed at the time of the observation of the surfaces of the toner particles means not that all of the fine particles or the particles of the external additive for a toner stick to the surfaces of the toner particles so that their substantially flat surfaces may be brought into contact therewith but that part of the fine particles or the particles of the external additive for a toner can migrate from the surfaces of the toner particles to the surface of the member. Under such state, the fine particle or the external additive for a toner that has migrated to the surface of the member contributes to an improvement in initial cleaning property, and the fine particle or the external additive for a toner that has stuck to the surface of each of the toner particles contributes to the maintenance of the initial cleaning property. As a result, when the toner repeatedly receives a mechanical stress, a satisfactory cleaning property can be achieved.

Figure 4:
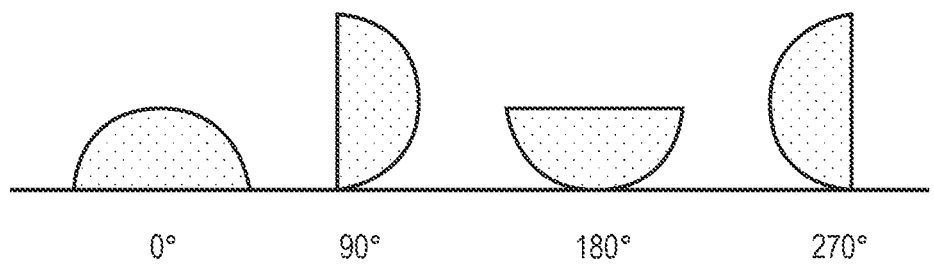
FIG. 4 is a view for illustrating examples of the angle of a substantially hemispherical fine particle when the surface of a toner particle is observed from a lateral direction.

In the toner of the present invention, when the angle of each of the fine particles in a state in which the substantially flat surfaces of the fine particles are in contact with the surface of each of the toner particles at the time of the observation of the surface of the toner particle from an arbitrary one direction is defined as 0°, the fine particles each having an angle of more than 90° and less than 270° are fine particles whose substantially flat surfaces are observed. In the toner of the present invention, when 1.0 number % or more of the fine particles present on the surface of the toner particle are fine particles whose substantially flat surfaces are observed, it is judged that the substantially flat surfaces of the fine particles are observed. Examples of the angle of the fine particle when the surface of the toner particle is observed from a lateral direction are illustrated in FIG. 4. The ratio of the fine particles whose substantially flat surfaces are observed is preferably 40.0 number % or less from the viewpoint of the contamination of the member. This is because when the ratio of the fine particles whose substantially flat surfaces are observed is 40.0 number % or less, a balance between the fine particles sticking to the surface of the toner particle and the fine particles sticking to the surface of the member becomes satisfactory, and hence a cleaning property after the toner has repeatedly received a mechanical stress is improved. The ratio of the fine particles whose substantially flat surfaces are observed on the surface of the toner particle is more preferably 20.0 number % or less.

The ratio of the fine particles whose substantially flat surfaces are observed when the surfaces of the toner particles are observed can be controlled by the shapes of the fine particles, the number of parts of the fine particles to be externally added to the toner, and conditions for the external addition. As described above, the shapes of the fine particles can be controlled by the kind and number of parts of the monomer of the fine particles, the reaction temperature, the reaction time, the reaction medium, and the pH of the reaction system at the time of the polymerization of the fine particles, the kind and concentration of the dispersant, and the shape and size of the substrate at the time of the manufacture of the fine particles.

In addition, the toner of the present invention preferably satisfies the following: when, at the time of the observation of a section intersecting the substantially flat surface of the fine particle present on the surface of the toner particle, a straight line that connects two points Pa and Pb of intersections of a line Lf and a line Lc is defined as an imaginary straight line Li, the line Lf being derived from the substantially flat surface, and the line Lc being derived from the curved surface, in a straight line Ls1 vertically intersecting the imaginary straight line Li, such a distance that one of distances Da and db that becomes maximum is defined as a maximum height "h", the distance Da being a distance between a point Pc and a point Pe, the point Pc being a point of intersection of the imaginary straight line Li and the straight line Ls1, a point Pe being a point of intersection of the line Lc and the straight line Ls1, the distance db being a distance between a point Pd and the point Pe, and the point Pd being a point of intersection of the line Lf and the straight line Ls1, and in a straight line Ls2 parallel to the imaginary straight line Li, such a distance Dc that becomes maximum is defined as a maximum width "b", the distance Dc being a distance between two points Pf and Pg of intersection of the straight line Ls2 and the line Lc, the number-average value of the ratio h/b of the maximum height "h" to the maximum width "b" is 0.33 to 0.80.

Further, in another aspect of the present invention, the external additive for a toner preferably satisfies the following: when, at the time of the observation of a section intersecting the substantially flat surface of the external additive for a toner, a straight line that connects two points Pa and Pb of intersections of a line Lf and a line Lc is defined as an imaginary straight line Li, the line Lf being derived from the substantially flat surface, and the line Lc being derived from the curved surface, in a straight line Ls1 vertically intersecting the imaginary straight line Li, such a distance that one of distances Da and db that becomes maximum is defined as a maximum height "h", the distance Da being a distance between a point Pc and a point Pe, the point Pc being a point of intersection of the imaginary straight line Li and the straight line Ls1, a point Pe being a point of intersection of the line Lc and the straight line Ls1, the distance db being a distance between a point Pd and the point Pe, and the point Pd being a point of intersection of the line Lf and the straight line Ls1, and in a straight line Ls2 parallel to the imaginary straight line Li, such a distance Dc that becomes maximum is defined as a maximum width "b", the distance Dc being a distance between two points Pf and Pg of intersection of the straight line Ls2 and the line Lc, the number-average value of the ratio h/b of the maximum height "h" to the maximum width "b" is 0.33 to 0.80.

Still further, in another aspect of the present invention, the fine particle preferably satisfies the following: when, at the time of the observation of a section intersecting the substantially flat surface of the fine particle, a straight line that connects two points Pa and Pb of intersections of a line Lf and a line Lc is defined as an imaginary straight line Li, the line Lf being derived from the substantially flat surface, and the line Lc being derived from the curved surface, in a straight line Ls1 vertically intersecting the imaginary straight line Li, such a distance that one of distances Da and db that becomes maximum is defined as a maximum height "h", the distance Da being a distance between a point Pc and a point Pe, the point Pc being a point of intersection of the imaginary straight line Li and the straight line Ls1, a point Pe being a point of intersection of the line Lc and the straight line Ls1, the distance db being a distance between a point Pd and the point Pe, and the point Pd being a point of intersection of the line Lf and the straight line Ls1, and in a straight line Ls2 parallel to the imaginary straight line Li, such a distance Dc that becomes maximum is defined as a maximum width "b", the distance Dc being a distance between two points Pf and Pg of intersection of the straight line Ls2 and the line Lc, the number-average value of the ratio h/b of the maximum height "h" to the maximum width "b" is 0.33 to 0.80.

The ratio h/b is calculated by measuring the maximum height "h" and the maximum width "b" in one fine particle or one particle of the external additive for a toner at the time of the observation of a section of the fine particle or the external additive for a toner. Examples of the maximum height "h" and the maximum width "b" are illustrated in FIG. 2A to FIG. 2D.

When the number-average value of the ratio h/b of the maximum height "h" to the maximum width "b" is 0.33 to 0.80, the cleaning property and low-temperature fixability of the toner in the case where the toner continuously receives a mechanical stress become more satisfactory. When the number-average value of the ratio h/b is 0.33 or more, the area of abutment between the fine particle or the external additive for a toner sticking to the surface of the toner particle and the member can be reduced. In addition, a distance between the toner particle and the member can be kept constant. As a result, an adhesive force between the toner particle and the member reduces, and hence the amount of the transfer residual toner is suppressed. Thus, the toner is more excellent in initial cleaning property. In addition, the area of the surface of the toner particle to be covered with one fine particle or one particle of the external additive for a toner can be suppressed, and hence a more advantageous effect on the low-temperature fixability is obtained. In addition, when the number-average value of the ratio h/b is 0.80 or less, even in the case where the fine particle or the external additive for a toner present on the surface of the toner particle repeatedly receives the mechanical stress, a state in which the fine particle or the external additive for a toner sticks to the surface of the toner particle can be kept. As a result, the migration of the fine particle or the external additive for a toner to the member is suppressed, and hence a further effect is exhibited on the maintenance of the cleaning property when the fine particle or the external additive for a toner continuously receives the mechanical stress.

The number-average value of the ratio h/b can be controlled by the kind and number of parts of the monomer of the fine particle or the external additive for a toner, a reaction temperature, a reaction time, a reaction medium, and the pH of a reaction system at the time of the polymerization of the monomer, and the kind of a dispersant for the monomer and the concentration thereof in the reaction system.

In the present invention, the fine particle present on the surface of the toner particle preferably includes at least one selected from the group consisting of structures represented by the following formula (D), formula (T), and formula (Q):

$$(Ra)(Rb)Si(O_{1/2})_2 \quad \text{Formula (D)}$$

$$Rc\text{-}Si(O_{1/2})_3 \quad \text{Formula (T)}$$

$$Si(O_{1/2})_4 \quad \text{Formula (Q)}$$

in the formula (D), the formula (T), and the formula (Q), Ra, Rb, and Rc each represent an organic group bonded to silicon.

In addition, in another aspect of the present invention, the external additive for a toner preferably includes at least one selected from the group consisting of the structures represented by the formula (D), the formula (T), and the formula (Q).

Further, in another aspect of the present invention, the fine particle preferably includes at least one selected from the group consisting of the structures represented by the formula (D), the formula (T), and the formula (Q).

When the fine particle or the external additive for a toner includes at least one selected from the group consisting of the structures represented by the formula (D), the formula (T), and the formula (Q), the initial cleaning property becomes more satisfactory.

Zero to two of the four valence electrons of a Si atom in each of the formula (D), the formula (T), and the formula (Q) are involved in bonding with Ra, Rb, and Rc, and the remaining two to four thereof are involved in bonding with an O atom. The O atom forms a state in which each of its two valence electrons is involved in bonding with Si, that is, a siloxane bond (Si—O—Si). Two Si atoms have one 0 atom, and hence a siloxane polymer moiety formed of a siloxane bond is represented as $-Si(O_{1/2})*$ (where * represents an integer of 2 to 4). As the integer represented by * becomes larger, the number of siloxane bonds increases, and hence the surface free energy of the fine particle or the external additive for a toner can be kept lower. Meanwhile, the organic group represented by any one of Ra, Rb, and Rc shows hydrophobicity, and hence the presence of any one of Ra, Rb, and Rc also reduces the surface free energy of the fine particle or the external additive for a toner. In the present invention, the fine particle or the external additive for a toner sticking to the surface of the toner particle is brought into abutment with the member, and hence a reduction in surface free energy of the fine particle or the external additive for a toner can keep an adhesive force between the fine particle or the external additive for a toner and the member low. Accordingly, when the fine particle or the external additive for a toner includes at least one selected from the group consisting of the structures represented by the formula (D), the formula (T), and the formula (Q), the transferability of the toner becomes satisfactory, thereby exhibiting an advantageous effect on the initial cleaning property thereof. The fine particle or the external additive for a toner more preferably includes the structure represented by the formula (T). In this case, a balance between the siloxane polymer moiety and organic group of the fine particle or the external additive for a toner becomes appropriate, and hence a further effect on the initial cleaning property is exhibited.

Ra, Rb, and Rc each represent preferably an organic group, more preferably a hydrocarbon group, still more preferably an alkyl group, the groups each having 1 to 8 (preferably 1 to 6) carbon atoms.

In addition, the content of the structure represented by the formula (D), the formula (T), and/or the formula (Q) in the fine particle or external additive for a toner of the present invention is preferably 50 mol % or more, more preferably 70 mol % or more.

The presence of the siloxane polymer moiety (—Si(O$_{1/2}$)* (where * represents an integer of 2 to 4)) in each of the structures represented by the formula (D), the formula (T), and the formula (Q) can be recognized by the $^{29}$Si-NMR measurement of the fine particle or the external additive for a toner. In addition, the presence of Ra, Rb, and Rc in the formula (D) and the formula (T) can be recognized by the $^{13}$C-NMR measurement of the fine particle or the external additive for a toner.

The toner of the present invention preferably includes 0.1 part by mass or more of a substantially hemispherical fine particle on the surface of the toner particle with respect to 100 parts by mass of the toner particle because the low-temperature fixability of the toner, and the cleaning properties thereof before and after continuous reception of a mechanical stress by the toner become satisfactory, and hence the effects of the present invention are exhibited. In addition, from the viewpoint of the low-temperature fixability, the toner preferably includes less than 4.0 parts by mass of the substantially hemispherical fine particle on the surface of the toner particle with respect to 100 parts by mass of the toner particle. In addition, from the viewpoint of preventing the contamination of the member, the toner more preferably includes less than 3.0 parts by mass of the substantially hemispherical fine particle on the surface of the toner particle with respect to 100 parts by mass of the toner particle.

The fine particle or external additive for a toner of the present invention preferably includes at least one selected from the group consisting of the condensation polymerization products of organosilicon compounds having structures represented by the formula (ZD), the formula (ZT), and the formula (ZQ):

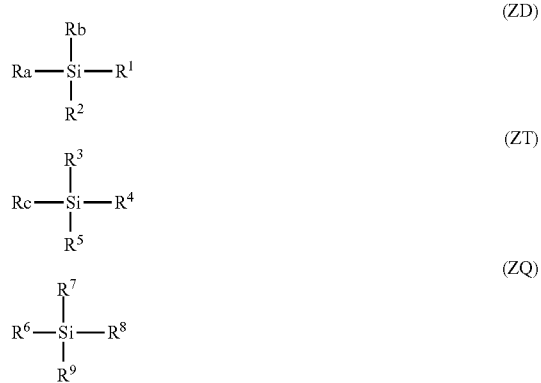

in the formula (ZD), the formula (ZT), and the formula (ZQ), Ra, Rb, and Rc each represent an organic group bonded to silicon, and $R^1$, $R^2$, $R^3$, $R^4$, $R^5$, $R^6$, $R^7$, $R^8$, and $R^9$ each independently represent a halogen atom, a hydroxy group, an acetoxy group, or an alkoxy group.

The condensation polymerization of an organosilicon compound having any one of Ra, Rb, and Rc can improve the hydrophobicity of the fine particle or the external additive for a toner, and hence causes the toner to exhibit an excellent effect in terms of initial cleaning property. Ra, Rb, and Rc are identical in meaning to Ra, Rb, and Rc in the structures represented by the formula (D), the formula (T), and the formula (Q), respectively, and each represent preferably an organic group, more preferably a hydrocarbon group, still more preferably an alkyl group, the groups each having 1 to 8 (preferably 1 to 6) carbon atoms.

In addition, $R^1$, $R^2$, $R^3$, $R^4$, $R^5$, $R^6$, $R^7$, $R^8$, and $R^9$ each independently represent a halogen atom, a hydroxy group, an acetoxy group, or an alkoxy group (these groups may hereinafter be collectively referred to as "reactive groups"). Those reactive groups undergo hydrolysis, addition polymerization, and condensation polymerization to form a cross-linked structure, and hence a fine particle or an external additive for a toner excellent in durability can be obtained. From the viewpoints of mild advance of the hydrolysis at room temperature and the property by which the fine particle or the external additive is deposited on the substrate, $R^1$, $R^2$, $R^3$, $R^4$, $R^5$, $R^6$, $R^7$, $R^8$ and $R^9$ each represent preferably an alkoxy group, more preferably a methoxy group and/or an ethoxy group. The hydrolysis, addition polymerization, and condensation polymerization of $R^1$, $R^2$, $R^3$, $R^4$, $R^5$, $R^6$, $R^7$, $R^8$, and $R^9$ can be controlled by a reaction temperature, a reaction time, a reaction medium, and the pH of a reaction system.

The content of the condensation polymerization product of the organosilicon compound having a structure represented by the formula (ZD), the formula (ZT), and/or the formula (ZQ) obtained as a result of the hydrolysis, the addition polymerization, and the condensation polymerization in the fine particle or the external additive for a toner is preferably 50 mol % or more, more preferably 70 mol % or more. In addition, the fine particle or the external additive more preferably includes the condensation polymerization product of the organosilicon compound having a structure represented by the formula (ZT) because a balance between the siloxane polymer moiety and organic group of the fine particle or the external additive becomes appropriate as described above.

To obtain the fine particle or the external additive for a toner, it is desired that an organosilicon compound (bifunctional silane) having, in a molecule thereof, two reactive groups ($R^1$ and $R^2$) except Ra and Rb in the formula (ZD), an organosilicon compound (trifunctional silane) having, in a molecule thereof, three reactive groups ($R^3$, $R^4$, and $R^5$) except Rc in the formula (ZT), and an organosilicon compound (tetrafunctional silane) having, in a molecule thereof, four reactive groups ($R^6$, $R^7$, $R^8$, and $R^9$) in the formula (ZQ) be used alone or in combination thereof.

Examples of the organosilicon compound having a structure represented by the formula (ZD) include dimethyldimethoxysilane, dimethyldiethoxysilane, 3-glycidoxypropylmethyldimethoxysilane, 3-glycidoxypropylmethyldiethoxysilane, 3-methacryloxypropylmethyldimethoxysilane, 3-methacryloxypropylmethyldiethoxysilane, N-2-(aminoethyl)-3-aminopropylmethyldimethoxysilane, and 3-mercaptopropylmethyldimethoxysilane.

Examples of the organosilicon compound having a structure represented by the formula (ZT) include: trifunctional vinylsilanes, such as vinyltrimethoxysilane, vinyltriethoxysilane, vinyldiethoxymethoxysilane, vinylethoxydimethoxysilane, vinyltrichlorosilane, vinylmethoxydichlorosilane, vinylethoxydichlorosilane, vinyldimethoxychlorosilane, vinylmethoxyethoxychlorosilane, vinyldiethoxychlorosilane, vinyltriacetoxysilane, vinyldiacetoxymethoxysilane, vinyldiacetoxyethoxysilane, vinylacetoxydimethoxysilane, vinylacetoxymethoxyethoxysilane, vinylacetoxydiethoxysilane, vinyltrihydroxysilane, vinylmethoxydihydroxysilane, vinylethoxydihydroxysilane, vinyldimethoxyhydroxysilane, vinylethoxymethoxyhydroxysilane, and vinyldiethoxyhydroxysilane; trifunctional allylsilanes, such as allyltrimethoxysilane, allyltriethoxysilane, allyldiethoxymethoxysilane, allylethoxydimethoxysilane, allyltrichlorosilane, allylmethoxydichlorosilane, allylethoxydichlorosilane, allyldimethoxychlorosilane, allylmethoxyethoxychlorosilane, allyldiethoxychlorosilane, allyltriacetoxysilane, allyldiacetoxymethoxysilane, allyldiacetoxyethoxysilane, allylacetoxydimethoxysilane, allylacetoxymethoxyethoxysilane, allylacetoxydiethoxysilane, allyltrihydroxysilane, allylmethoxydihydroxysilane, allylethoxydihydroxysilane, allyldimethoxyhydroxysilane, allylethoxymethoxyhydroxysilane, and allyldiethoxyhydroxysilane; trifunctional styrylsilanes, such as p-styryltrimethoxysilane; trifunctional methylsilanes, such as methyltrimethoxysilane, methyltriethoxysilane, methyldiethoxymethoxysilane, methylethoxydimethoxysilane, methyltrichlorosilane, methylmethoxydichlorosilane, methylethoxydichlorosilane, methyldimethoxychlorosilane, methylmethoxyethoxychlorosilane, methyldiethoxychlorosilane, methyltriacetoxysilane, methyldiacetoxymethoxysilane, methyldiacetoxyethoxysilane, methylacetoxydimethoxysilane, methylacetoxymethoxyethoxysilane, methylacetoxydiethoxysilane, methyltrihydroxysilane, methylmethoxydihydroxysilane, methylethoxydihydroxysilane, methyldimethoxyhydroxysilane, methylethoxymethoxyhydroxysilane, and methyldiethoxyhydroxysilane; trifunctional ethyl silanes, such as ethyltrimethoxysilane, ethyltriethoxysilane, ethyltrichlorosilane, ethyltriacetoxysilane, and ethyltrihydroxysilane; trifunctional propylsilanes, such as propyltrimethoxysilane, propyltriethoxysilane, propyltrichlorosilane, propyltriacetoxysilane, and propyltrihydroxysilane; trifunctional butylsilanes, such as butyltrimethoxysilane, butyltriethoxysilane, butyltrichlorosilane, butyltriacetoxysilane, and butyltrihydroxysilane; trifunctional hexylsilanes, such as hexyltrimethoxysilane, hexyltriethoxysilane, hexyltrichlorosilane, hexyltriacetoxysilane, and hexyltrihydroxysilane; and trifunctional phenylsilanes, such as phenyltrimethoxysilane, phenyltriethoxysilane, phenyltrichlorosilane, phenyltriacetoxysilane, and phenyltrihydroxysilane; trifunctional epoxysilanes, such as 3-glycidoxypropyltrimethoxysilane, 3-glycidoxypropyltriethoxysilane, and 2-(3,4-epoxycyclohexyl) ethyltrimethoxysilane; trifunctional methacrylsilanes, such as 3-methacryloxypropyltrimethoxysilane and 3-methacryloxypropyltriethoxysilane; trifunctional acryl silanes, such as 3-acryloxypropyltrimethoxysilane; trifunctional aminosilanes, such as 3-aminopropyltrimethoxysilane, 3-aminopropyltriethoxysilane, N-2-(aminoethyl)-3-aminopropyltrimethoxysilane, N-2-(aminoethyl)-3-aminopropyltriethoxysilane, and N-phenyl-3-aminopropyltrimethoxysilane; trifunctional ureidosilanes, such as 3-ureidopropyltriethoxysilane; trifunctional 3-chloropropylsilanes, such as 3-chloropropyltrimethoxysilane; trifunctional mercaptosilanes, such as 3-mercaptopropyltrimethoxysilane and 3-mercaptopropyltriethoxysilane; trifunctional sulfidosilanes, such as bis(triethoxysilylpropyl) tetrasulfide; and trifunctional isocyanatosilanes, such as 3-isocyanatopropyltriethoxysilane.

Examples of the organosilicon compound having a structure represented by the formula (ZQ) include: tetraalkoxysilanes, such as tetramethoxysilane and tetraethoxysilane; tetraalkylcarboxysilanes, such as tetraacetoxysilane; and tetrahalosilanes, such as tetrachlorosilane.

In addition, the fine particle or the external additive for a toner may include any one of the condensation polymerization products of an organosilicon compound (monofunctional silane) having one reactive group in a molecule thereof, and of bifunctional silanes, trifunctional silanes, and tetrafunctional silanes except those described above in addition to the condensation polymerization product of the organosilicon compound having a structure represented by the formula (ZD), the formula (ZT), and/or the formula (ZQ). Examples thereof include the following.

Hexamethyldisilane, trimethylsilyl chloride, triethylsilyl chloride, triisopropyl silyl chloride, t-butyldimethyl silyl chloride, N,N'-bis(trimethyl silyl)urea, N,O-bis(trimethylsilyl)trifluoroacetamide, trimethylsilyl trifluoromethanesulfonate, 1,3-dichloro-1,1,3,3-tetraisopropyldisiloxane, trimethylsilylacetylene, hexamethyldisilane, tetraisocyanatosilane, methyltriisocyanatosilane, and vinyltriisocyanatosilane.

Further, the fine particle or the external additive for a toner may include any one of the condensation polymerization products of an organotitanium compound and an organoaluminum compound in addition to the condensation polymerization product of the organosilicon compound having a structure represented by the formula (ZD), (ZT), or (ZQ).

Examples of the organotitanium compound include titanium methoxide, titanium ethoxide, titanium n-propoxide, tetra-i-propoxytitanium, tetra-n-butoxytitanium, titanium isobutoxide, a titanium butoxide dimer, titanium tetra-2-ethylhexoxide, titanium diisopropoxy bis(acetylacetonate), titanium tetraacetylacetonate, titanium di-2-ethylhexoxy bis (2-ethyl-3-hydroxyhexoxide), titanium diisopropoxy bis (ethylacetoacetate), tetrakis(2-ethylhexyloxy)titanium, di-i-propoxy-bis(acetylacetonato)titanium, titanium lactate, titanium methacrylate isopropoxide, triisopropoxy titanate, titanium methoxypropoxide, and titanium stearyl oxide.

Examples of the organoaluminum compound include aluminum(III) n-butoxide, aluminum(III) s-butoxide, aluminum(III) s-butoxide bis(ethylacetoacetate), aluminum(III) t-butoxide, aluminum(III) di-s-butoxide ethylacetoacetate, aluminum(III) diisopropoxide ethylacetoacetate, aluminum (III) ethoxide, aluminum(III) ethoxyethoxyethoxide, aluminum hexafluoropentanedionate, aluminum(III) 3-hydroxy-2-methyl-4-pyronate, aluminum(III) isopropoxide, aluminum-9-octadecenylacetoacetate diisopropoxide, aluminum(III) 2,4-pentanedionate, aluminum phenoxide, and aluminum(III) 2,2,6,6-tetramethyl-3,5-heptanedionate.

Those organosilicon compounds, organotitanium compounds, and organoaluminum compounds may be used alone or in combination thereof.

A specific method of manufacturing the fine particle or external additive for a toner of the present invention is described below, but the manufacturing method is not limited thereto.

The method of manufacturing the fine particle or the external additive for a toner is, for example, a sol-gel method. The sol-gel method is a method in which a metal alkoxide M(OR)n (M: a metal, O: oxygen, R: a hydrocarbon, n: the oxidation number of the metal) is used as a starting raw material, and the metal alkoxide is subjected to hydrolysis and condensation polymerization in a medium to be caused to gel through a sol state. When the fine particle or the external additive for a toner includes the structure represented by the formula (D), (T), or (Q), the organosilicon compound having a structure represented by the formula (ZD), (ZT), or (ZQ) only needs to be used as the metal alkoxide M(OR)n. The method is used in the synthesis of glass, a ceramic, an organic-inorganic hybrid, or a nanocomposite. When the manufacturing method is used, functional materials of various shapes, such as a surface layer, a fiber, a bulk body, and a fine particle, can each be produced from a liquid phase at low temperature. Further, in the sol-gel method, various fine structures and shapes can be produced because a solution is used as a starting raw material and the material is formed by causing the solution to gel. The fine structures and the shapes may be adjusted by, for example, the kind and number of parts of a monomer, a reaction temperature, a reaction time, a reaction medium, and the pH of a reaction system, and the kind and concentration of a dispersant.

In general, it is known that, in a sol-gel reaction, the bonding state of a metalloxane bond (M-O-M) to be produced varies depending on the acidity of a reaction medium. Specifically, when the reaction medium is acidic, a hydrogen ion is electrophilically added to oxygen of one reactive group (for example, an alkoxy group). Then, an oxygen atom in a water molecule is coordinated to a metal atom to become a hydroxy group through a substitution reaction. When water exists sufficiently, one hydrogen ion attacks one oxygen of the reactive group (for example, an alkoxy group). Accordingly, when the content of the hydrogen ion in the medium and the amount of the reactive group reduce along with the advance of the reaction, the substitution reaction to the hydroxy group becomes slow. Thus, a polycondensation reaction occurs before all the reactive groups bonded to metal atoms are subjected to hydrolysis, and hence a one-dimensional linear polymer or a two-dimensional polymer is produced relatively easily.

Meanwhile, when the medium is alkaline, a hydroxide ion is added to a metal atom to form a five-coordinated intermediate. Accordingly, all the reactive groups (for example, alkoxy groups) are easily eliminated to be easily substituted by a hydroxy group. In particular, when a metal compound having three or more reactive groups in the same metal atom is used, hydrolysis and polycondensation occur three-dimensionally, to thereby form an organometallic polymer having a large number of three-dimensional crosslinking bonds. In addition, the reaction is finished within a short time period.

Thus, in order to form a fine particle or an external additive for a toner formed of an organometallic polymer, it is preferred that the sol-gel reaction be advanced in the reaction medium under an alkaline state. When the fine particle or the external additive for a toner is manufactured in an aqueous medium, specifically, it is preferred that the reaction be advanced at a pH of 8.0 or more. Thus, a fine particle or an external additive for a toner that has a higher strength and is excellent in durability can be formed.

Examples of the aqueous medium include: water; and a mixed solvent of water and an alcohol, such as methanol, ethanol, or propanol.

In addition, in order that the shape of the fine particle or external additive for a toner of the present invention may be a solid and substantially hemispherical shape, and the number-average value of the longest diameter "w" of the substantially flat surface thereof may be controlled to 10 to 400 nm, the manufacture is preferably performed by dispersing an organometallic compound and a substrate in the medium.

First, the substrate is dispersed in the medium to provide a substrate-dispersed liquid. The substrate is preferably dispersed at such a concentration that the solid content of the substrate is 5 to 40 mass % with respect to the total amount of the substrate-dispersed liquid. A dispersion stabilizer to be described later may be appropriately used. In addition, the temperature of the substrate-dispersed liquid is preferably adjusted to 35° C. or more. Further, the pH of the substrate-dispersed liquid is preferably adjusted to the pH at which the condensation of the organometallic compound hardly advances. Although the pH at which the condensation of the organometallic compound hardly advances varies depending on the kind of the organometallic compound, the pH of the substrate-dispersed liquid is preferably adjusted within the range of the pH at which the reaction most hardly advances serving as a center plus and minus 0.5. There is no need to completely disperse the substrate in the medium. For example, when the substrate is a flat plate, the following may be performed: the flat plate is leaned in a reaction vessel, and the condensation is advanced on the substrate.

Next, the organometallic compound is preferably subjected to hydrolysis treatment before its use. For example, the organometallic compound may be subjected to the hydrolysis treatment in another vessel. With regard to a loading concentration in the hydrolysis treatment, when the amount of the organometallic compound is set to 100 parts by mass, the amount of water from which an ionic content has been removed, such as ion-exchanged water or RO water, is preferably 40 to 500 parts by mass, and the amount of the water is more preferably 100 to 400 parts by mass. The hydrolysis treatment is preferably performed under the conditions of a pH of 1.0 to 7.0, a temperature of 15 to 80° C., and a time period of 1 to 600 minutes.

Then, the organometallic compound subjected to the hydrolysis treatment is added to the substrate-dispersed liquid. The substrate-dispersed liquid and the hydrolyzed liquid of the organometallic compound are stirred and mixed, and the mixture is preferably held at 35° C. or more for 3 to 120 minutes. After that, the pH of the mixture is adjusted to a pH suitable for the condensation of the organometallic compound (preferably a pH of 6.0 or more, or a pH of 3.0 or less, more preferably a pH of 8.0 or more) so that the organometallic compound may be condensed in one stroke, followed by the holding of the resultant preferably at a temperature of 35° C. or more for 60 minutes or more. Thus, a fine particle or an external additive for a toner formed of an organometallic polymer, such as an organosilicon polymer, is formed on the surface of the substrate.

Then, the substrate having formed on its surface the fine particle or the external additive for a toner is stirred and mixed with a medium having high solubility for the substrate and having low solubility for the fine particle or the external additive for a toner so that only the substrate may be dissolved. The solubility varies depending on a material for the substrate and the kind of the medium, and hence the solid content concentration of the substrate, a stirring time, and a stirring temperature are each set within such a range that the substrate is sufficiently dissolved. After that, the fine particle or the external additive for a toner is separated by an approach, such as centrifugation, and is dried. Thus, solid and substantially hemispherical fine particles can be obtained. When the solubility of the substrate is low, the fine particle or the external additive for a toner may be separated by: lifting the substrate as it is from the reaction vessel; and peeling the fine particle or the external additive for a toner from the substrate.

The substrate to be used at the time of the manufacture of the fine particle or external additive for a toner of the present invention is suitably, for example, any one of the following substrates from the viewpoint of its separability from the fine particle or the external additive for a toner: various flat plates made of a metal, glass, a ceramic, and the like; and resin particles. Of those, resin particles each having a low degree of crosslinking and certain solubility are particularly preferred. The size of each of the resin particles is preferably 1 to 100 μm because the particle diameter of the substrate is several tens of times or more as large as the particle diameter of the fine particle or the external additive for a toner, and hence the fine particle or the external additive for a toner of a substantially hemispherical shape having a substantially flat surface and a curved surface can be easily manufactured. Although a material for the resin particles is not particularly limited, polymethyl methacrylate (PMMA) particles, polystyrene fine particles, and the like manufactured by soap-free emulsion polymerization and the like are suitable.

In addition, at the time of the dispersion of the organometallic compound and the substrate in the medium, a known surfactant, and known inorganic and organic dispersants may each be used as a dispersion stabilizer.

Examples of the surfactant include:
(1) anionic surfactants: alkyl sulfates, such as sodium lauryl sulfate; polyoxyethylene alkyl ether sulfate salts, such as sodium polyoxyethylene lauryl ether sulfate; sulfonic acid salts, such as sodium dodecylbenzenesulfonate and sodium alkylnaphthalenesulfonate; and higher fatty acid salts, such as sodium stearate and sodium laurate;
(2) cationic surfactants: quaternary ammonium salts, such as dodecylammonium bromide, dodecyltrimethylammonium bromide, dodecylpyridinium chloride, dodecylpyridinium bromide, hexadecyltrimethylammonium bromide, lauryltrimethylammonium chloride, and an alkylbenzyldimethylammonium chloride; and
(3) nonionic surfactants: polyoxyethylene alkyl ethers, such as polyoxyethylene lauryl ether and polyoxyethylene oleyl ether; polyoxyalkylene derivatives, such as a polyoxyethylene alkylene alkyl ether; sorbitan fatty acid esters, such as sorbitan monolaurate and sorbitan monostearate; glycerin fatty acid esters, such as glycerol monostearate; and polyoxyethylene fatty acid esters, such as polyethylene glycol monolaurate.

In addition, examples of the inorganic dispersant include: trivalent aluminum salts, such as aluminum chloride, aluminum sulfate, aluminum hydroxide, aluminum phosphate, and polyaluminum chloride; trivalent and divalent iron salts, such as iron(III) chloride, iron(III) sulfate, iron(III) hydroxide, iron(II) chloride, iron(II) sulfate, iron(II) hydroxide, polyferric sulfate, and polysilicate iron; divalent magnesium salts, such as magnesium chloride, magnesium sulfate, magnesium hydroxide, magnesium phosphate, and magnesium carbonate; divalent calcium salts, such as calcium chloride, calcium sulfate, tricalcium phosphate, calcium hydrogen phosphate, calcium dihydrogen phosphate, calcium hydroxide, hydroxyapatite, calcium carbonate, and calcium metasilicate; divalent cobalt salts, such as cobalt chloride and cobalt sulfate; divalent zinc salts, such as zinc phosphate; divalent barium salts, such as barium sulfate; silicate minerals, such as bentonite; and metal oxides, such as silica and alumina.

In addition, examples of the organic dispersant include polyvinyl alcohol, gelatin, methyl cellulose, hydroxypropyl methyl cellulose, ethyl cellulose, carboxymethyl cellulose sodium salt, and starch.

Those dispersion stabilizers are appropriately selected in accordance with the material for the substrate and interactions with the organometallic compound. Those dispersion stabilizers may be used alone or in combination thereof.

Next, components to be incorporated into the toner particle are described.

The toner particle in the toner of the present invention contains the binder resin, the colorant, and any other component.

A resin (preferably an amorphous resin) that has been generally used as a binder resin for a toner may be used as the binder resin. Specifically, a styrene-acrylic resin (e.g., a styrene-acrylate copolymer or a styrene-methacrylate copolymer), a polyester resin, an epoxy resin, a polyurethane resin, a polyamide resin, a cellulose resin, a polyether resin, a styrene-butadiene copolymer, a mixed resin or composite resin thereof, or the like may be used.

Examples of a polymerizable monomer in the styrene-acrylic resin may include the following vinyl-based polymerizable monomers: styrene; styrene derivatives, such as α-methylstyrene, β-methylstyrene, o-methylstyrene, m-methylstyrene, p-methyl styrene, 2,4-dimethyl styrene, p-n-butyl styrene, p-tert-butyl styrene, p-n-hexyl styrene, p-n-octylstyrene, p-n-nonyl styrene, p-n-decyl styrene, p-n-dodecyl styrene, p-methoxystyrene, and p-phenylstyrene; acrylic polymerizable monomers, such as methyl acrylate, ethyl acrylate, n-propyl acrylate, iso-propyl acrylate, n-butyl acrylate, iso-butyl acrylate, tert-butyl acrylate, n-amyl acrylate, n-hexyl acrylate, 2-ethylhexyl acrylate, n-octyl acrylate, n-nonyl acrylate, cyclohexyl acrylate, benzyl acrylate, dimethyl phosphate ethyl acrylate, diethyl phosphate ethyl acrylate, dibutyl phosphate ethyl acrylate, and 2-benzoyloxyethyl acrylate; methacrylic polymerizable monomers, such as methyl methacrylate, ethyl methacrylate, n-propyl methacrylate, iso-propyl methacrylate, n-butyl methacrylate, iso-butyl methacrylate, tert-butyl methacrylate, n-amyl methacrylate, n-hexyl methacrylate, 2-ethylhexyl methacrylate, n-octyl methacrylate, n-nonyl methacrylate, diethyl phosphate ethyl methacrylate, and dibutyl phosphate ethyl methacrylate; methylene aliphatic monocarboxylic acid esters; vinyl esters, such as vinyl acetate, vinyl propionate, vinyl benzoate, vinyl butyrate, vinyl benzoate, and vinyl formate; vinyl ethers, such as vinyl methyl ether, vinyl ethyl ether, and vinyl isobutyl ether; and vinyl methyl ketone, vinyl hexyl ketone, and vinyl isopropyl ketone.

In addition, a polymerization initiator may be added in the polymerization of the polymerizable monomer. Examples of the polymerization initiator include: azo-based or diazo-based polymerization initiators, such as 2,2'-azobis-(2,4-dimethylvaleronitrile), 2,2'-azobisisobutyronitrile, 1,1'-azobis(cyclohexane-1-carbonitrile), 2,2'-azobis-4-methoxy-2,4-dimethylvaleronitrile, and azobisisobutyronitrile; and peroxide-based polymerization initiators, such as benzoyl peroxide, methyl ethyl ketone peroxide, diisopropyl peroxycarbonate, cumene hydroperoxide, 2,4-dichlorobenzoyl peroxide, and lauroyl peroxide. Any such polymerization initiator is preferably added in an amount of 0.5 to 30.0 parts by mass with respect to 100 parts by mass of the total of the polymerizable monomer. Those polymerization initiators may be used alone or in combination thereof.

In order to control the molecular weight of the binder resin forming the toner particle, a chain transfer agent may be added in the polymerization of the polymerizable monomer. The weight-average molecular weight of the binder resin is preferably 5,000 to 100,000. The chain transfer agent is preferably added in an amount of 0.001 to 15.000 parts by mass with respect to 100 parts by mass of the total of the polymerizable monomer.

In order to control the molecular weight of the binder resin forming the toner particle, a crosslinking agent may be added in the polymerization of the polymerizable monomer. Examples of the crosslinking agent include divinylbenzene, bis(4-acryloxypolyethoxyphenyl)propane, ethylene glycol diacrylate, 1,3-butylene glycol diacrylate, 1,4-butanediol diacrylate, 1,5-pentanediol diacrylate, 1,6-hexanediol diacrylate, neopentyl glycol diacrylate, diethylene glycol diacrylate, triethylene glycol diacrylate, tetraethylene glycol diacrylate, diacrylates of polyethylene glycols #200, #400, and #600, dipropylene glycol diacrylate, polypropylene glycol diacrylate, a polyester-type diacrylate, and compounds obtained by changing the above-mentioned acrylates to methacrylates. As a polyfunctional crosslinkable monomer, there are given: pentaerythritol triacrylate, trimethylolethane triacrylate, trimethylolpropane triacrylate, tetramethylolmethane tetraacrylate, oligoester acrylate, and methacrylates thereof, 2,2-bis(4-methacryloxy-polyethoxyphenyl)propane, diallyl phthalate, triallyl cyanurate, triallyl isocyanurate, triallyl trimellitate, and diallyl chlorendate. The crosslinking agent is preferably added in an amount of 0.001 to 15.000 parts by mass with respect to 100 parts by mass of the total of the polymerizable monomer.

A polyester resin obtained by subjecting a carboxylic acid component and an alcohol component to polycondensation may be used as the polyester resin.

Examples of the carboxylic acid component include: dicarboxylic acids, such as oxalic acid, succinic acid, glutaric acid, maleic acid, adipic acid, β-methyladipic acid, azelaic acid, sebacic acid, nonanedicarboxylic acid, decanedicarboxylic acid, undecanedicarboxylic acid, dodecanedicarboxylic acid, fumaric acid, citraconic acid, diglycolic acid, cyclohexane-3,5-diene-1,2-carboxylic acid, hexahydroterephthalic acid, malonic acid, pimelic acid, suberic acid, phthalic acid, isophthalic acid, terephthalic acid, tetrachlorophthalic acid, chlorophthalic acid, nitrophthalic acid, p-carboxyphenylacetic acid, p-phenylenediacetic acid, m-phenylenediacetic acid, o-phenylenediacetic acid, diphenylacetic acid, diphenyl-p,p'-dicarboxylic acid, naphthalene-1,4-dicarboxylic acid, naphthalene-1,5-dicarboxylic acid, naphthalene-2,6-dicarboxylic acid, anthracenedicarboxylic acid, and cyclohexanedicarboxylic acid; and polyvalent carboxylic acids, such as trimellitic acid, trimesic acid, pyromellitic acid, naphthalenetricarboxylic acid, naphthalenetetracarboxylic acid, pyrenetricarboxylic acid, pyrenetetracarboxylic acid, itaconic acid, glutaconic acid, n-dodecylsuccinic acid, n-dodecenyl succinic acid, isododecylsuccinic acid, isododecenylsuccinic acid, n-octylsuccinic acid, and n-octenylsuccinic acid. Those components may be used alone or in combination thereof.

Examples of the alcohol component include: diols, such as ethylene glycol, diethylene glycol, triethylene glycol, 1,2-propylene glycol, 1,3-propylene glycol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,18-octadecanediol, 1,14-eicosanedecanediol, diethylene glycol, triethylene glycol, dipropylene glycol, polyethylene glycol, polypropylene glycol, polytetramethylene ether glycol, 1,4-cyclohexanediol, 1,4-cyclohexanedimethanol, 1,4-butenediol, neopentyl glycol, 1,4-cyclohexanediol, polytetramethylene glycol, hydrogenated bisphenol A, bisphenol A, bisphenol F, bisphenol S, and alkylene oxide (e.g., ethylene oxide, propylene oxide, and butylene oxide) adducts of the above-mentioned bisphenols; and polyols, such as glycerin, trimethylolethane, trimethylolpropane, pentaerythritol, hexamethylol melamine, hexaethylol melamine, tetramethylol benzoguanamine, tetraethylol benzoguanamine, sorbitol, trisphenol PA, phenol novolac, cresol novolac, and alkylene oxide adducts of the above-mentioned trihydric or higher polyphenols. Those components may be used alone or in combination thereof. In addition, the polyester resin may be a polyester resin containing a urea group.

The colorant is not particularly limited, and the following known colorants may each be used.

As yellow pigments, there are used yellow iron oxide, naples yellow, naphthol yellow S, hansa yellow G, hansa yellow 10G, benzidine yellow G, benzidine yellow GR, quinoline yellow lake, permanent yellow NCG, tartrazine lake, and other condensed azo compounds, isoindolinone compounds, anthraquinone compounds, azo metal complexes, methine compounds, and allyl amide compounds. Specific examples thereof include C.I. Pigment Yellow 12, 13, 14, 15, 17, 62, 74, 83, 93, 94, 95, 109, 110, 111, 128, 129, 147, 155, 168, and 180.

As orange pigments, there are given permanent orange GTR, pyrazolone orange, vulcan orange, benzidine orange G, indanthrene brilliant orange RK, and indanthrene brilliant orange GK.

As red pigments, there are given colcothar, permanent red 4R, lithol red, pyrazolone red, watching red calcium salt, lake red C, lake red D, brilliant carmine 6B, brilliant carmine 3B, eosin lake, rhodamine lake B, alizarin lake, and other condensed azo compounds, diketopyrrolopyrrole compounds, anthraquinone compounds, quinacridone compounds, basic dye lake compounds, naphthol compounds, benzimidazolone compounds, thioindigo compounds, and perylene compounds. Specific examples thereof include C.I. Pigment Red 2, 3, 5, 6, 7, 23, 48:2, 48:3, 48:4, 57:1, 81:1, 122, 144, 146, 166, 169, 177, 184, 185, 202, 206, 220, 221, and 254.

As blue pigments, there are given alkali blue lake, Victoria blue lake, phthalocyanine blue, metal-free phthalocyanine blue, partially chlorinated phthalocyanine blue, fast sky blue, indanthrene blue BG, and other copper phthalocyanine compounds and derivatives thereof, anthraquinone compounds, and basic dye lake compounds. Specific examples thereof include C.I. Pigment Blue 1, 7, 15, 15:1, 15:2, 15:3, 15:4, 60, 62, and 66.

As violet pigments, there are given fast violet B and methyl violet lake.

As green pigments, there are given Pigment Green B, malachite green lake, and final yellow green G. As white pigments, there are given zinc white, titanium oxide, antimony white, and zinc sulfide.

As black pigments, there are given carbon black, aniline black, nonmagnetic ferrite, magnetite, and pigments toned to black with the yellow colorants, the red colorants, and the blue colorants. Those colorants may be used alone or as a mixture thereof, and in the state of a solid solution.

The content of the colorant is preferably 3.0 to 15.0 parts by mass with respect to 100 parts by mass of the total of the binder resin or the polymerizable monomer for producing the binder resin.

The toner may contain a release agent. The release agent is not particularly limited, and the following known release agents may each be used: petroleum-based waxes, such as a paraffin wax, a microcrystalline wax, and petrolatum, and derivatives thereof; a Montan wax and derivatives thereof; a hydrocarbon wax produced by a Fischer-Tropsch process and derivatives thereof; polyolefin waxes, such as polyethylene and polypropylene, and derivatives thereof; natural waxes, such as a carnauba wax and a candelilla wax, and derivatives thereof; higher aliphatic alcohols; fatty acids, such as stearic acid and palmitic acid, or compounds, acid amide waxes, ester waxes, or ketones thereof; a hydrogenated castor oil and derivatives thereof; plant waxes; animal waxes; and silicone resins. The derivatives include oxides, and block copolymerization products or graft-modified products with vinyl-based monomers. Those release agents may be used alone or as a mixture thereof.

The content of the release agent is preferably 5.0 to 30.0 parts by mass with respect to 100 parts by mass of the total of the binder resin or the polymerizable monomer for producing the binder resin.

The toner may include a crystalline resin. The crystalline resin is not particularly limited, and a known resin may be used. Specific examples thereof include a crystalline polyester resin and a crystalline acrylic resin. The crystalline resin may be a block polymer having a crystalline moiety and an amorphous moiety.

The toner may include a charge control agent, and a known charge control agent may be used. The addition amount of such charge control agent is preferably 0.01 to 10.00 parts by mass with respect to 100 parts by mass of the total of the binder resin or the polymerizable monomer for producing the binder resin.

In addition, various organic fine powders or inorganic fine powders may each be externally added to the toner particle as required in addition to the fine particle of the present invention.

For example, the following fine powders are used as the organic fine powders or the inorganic fine powders.
  (1) Flowability imparting agents: silica, alumina, titanium oxide, carbon black, and carbon fluoride.
  (2) Abrasives: metal oxides (e.g., strontium titanate, cerium oxide, alumina, magnesium oxide, and chromium oxide), nitrides (e.g., silicon nitride), carbides (e.g., silicon carbide), and metal salts (e.g., calcium sulfate, barium sulfate, and calcium carbonate).
  (3) Lubricants: fluorine-based resin powders (e.g., vinylidene fluoride and polytetrafluoroethylene) and fatty acid metal salts (e.g., zinc stearate and calcium stearate).
  (4) Charge controllable particles: metal oxides (e.g., tin oxide, titanium oxide, zinc oxide, silica, and alumina) and carbon black.

The surface of the organic fine powder or the inorganic fine powder may be subjected to hydrophobic treatment for an improvement in flowability of the toner and the uniformization of the charging of the toner particles. Examples of a treatment agent for the hydrophobic treatment of the organic fine powder or the inorganic fine powder include an unmodified silicone varnish, various modified silicone varnishes, an unmodified silicone oil, various modified silicone oils, a silane compound, a silane coupling agent, other organosilicon compounds, and an organotitanium compound. Those treatment agents may be used alone or in combination thereof.

In addition, examples of a method of manufacturing the toner particles are listed below.
  (1) Suspension polymerization method: The toner particles are obtained by granulating a polymerizable monomer composition containing the polymerizable monomer capable of producing the binder resin and the release agent, and as required, the colorant or the like in an aqueous medium to polymerize the polymerizable monomer.
  (2) Pulverization method: The toner particles are obtained by melting and kneading the binder resin and the release agent, and as required, the colorant or the like, and pulverizing the resultant.
  (3) Dissolution suspension method: The toner particles are obtained by: dissolving the binder resin and the release agent, and as required, the colorant or the like in an organic solvent to manufacture an organic phase-dispersed liquid; suspending the liquid in the aqueous medium; granulating and polymerizing the suspension; and then removing the organic solvent.
  (4) Emulsion aggregation polymerization method: The toner particles are obtained by: aggregating binder resin particles and release agent particles, and as required, the particles of the colorant or the like in the aqueous medium; and associating the aggregate.

Examples of the aqueous medium include: water; and a mixed solvent of water and an alcohol, such as methanol, ethanol, or propanol.

Various measurement methods related to the present invention are described below.

<Method of Recognizing that Fine Particle or External Additive for Toner is Solid>

The fact that the fine particle or the external additive for a toner is solid is recognized with a scanning transmission electron microscope (STEM).

A sample for STEM observation is prepared as described below.

First, the toner, or the fine particle or the external additive for a toner is spread on a cover glass (Matsunami Glass Ind., Ltd., square cover glass; SQUARE No. 1) so as to form one layer, and an Os film (5 nm) and a naphthalene film (20 nm) are applied as protective films to the toner, or the fine particle or the external additive for a toner with an osmium plasma coater (Filgen, Inc., OPC80T).

Next, a PTFE-made tube ($\varphi 1.5$ mm×$\varphi 3$ mm×3 mm) is filled with a photocurable resin D800 (JEOL Ltd.), and the cover glass is quietly placed on the tube in such a direction that the toner, or the fine particle or the external additive for a toner is brought into contact with the photocurable resin D800. Under the state, light is applied to cure the resin, and then the cover glass and the tube are removed. Thus, a columnar resin having the toner, or the fine particle or the external additive for a toner embedded in its outermost surface is formed.

Cutting with an ultrasonic ultramicrotome (Leica Microsystems, UC7) is started from the outermost surface of the columnar resin at a cutting speed of 0.6 mm/s to expose a section of the central portion of the fine particle or the external additive for a toner. Next, the exposed section is cut so as to have a thickness of 100 nm. Thus, a thin sample of the section of the fine particle or the external additive for a toner is produced. The section of the central portion of the fine particle or the external additive for a toner can be obtained through the cutting by such approach.

The used STEM apparatus, and an observation method and observation conditions are as described below.
Apparatus: A Transmission Electron Microscope Tecnai TF20XT Manufactured by FEI Company An image of the thin sample is obtained while the probe size and image size of the STEM are set to 1 nm and 1,024×1,024 pixels, respectively. In addition, the image is obtained while the Contrast and Brightness of the Detector Control panel of the STEM for a bright-field image are adjusted to 1,425 and 3,750, respectively, and the Contrast, Brightness, and Gamma of the Image Control panel thereof are adjusted to 0.0, 0.5, and 1.00, respectively. The observation is performed at an image magnification of 100,000 to 200,000.

When a state in which the inside of the fine particle or the external additive for a toner is filled with a solid, and is hence not hollow is observed in the resultant STEM image, the fine particle or the external additive is judged to be solid.

In addition, in the present invention, a fine particle or an external additive for a toner having a ratio df/h of more than 0.10 is regarded as being hollow even when the fine particle or the external additive is solid. For example, the fine particle or the external additive for a toner illustrated in FIG. 2A, FIG. 2B, or FIG. 2D is solid, but the fine particle or the external additive for a toner illustrated in FIG. 2C is hollow.

<Method of Recognizing that Fine Particle or External Additive for Toner is Substantially Hemispherical Shape>

The fact that the fine particle or the external additive for a toner is a substantially hemispherical shape is recognized with a scanning transmission electron microscope (STEM).

The preparation of a sample for STEM observation, the STEM apparatus, and a method and conditions for the observation are as described above.

The number-average values of the ratio df/h, ratio l1/l2, and ratio s1/s2 of the fine particle or the external additive for a toner are calculated from the resultant STEM image with image processing software ImageJ (developer: Wayne Rasband). A method for the calculation is described below with reference to FIG. 2A to FIG. 2D.

First, a scale bar in an observation condition-displaying portion displayed in the lower portion of the image is selected with the straight line tool (Straight Line) of the tool bar of the software. When the Set Scale of the Analyze menu thereof is selected under the state, a new window is opened, and the pixel distance of a selected straight line is input in the "Distance in Pixels" column of the window. The value (e.g., 100) of the scale bar is input in the "Known Distance" column of the window, and the unit (e.g., nm) of the scale bar is input in the "Unit of Measurement" column thereof, followed by the clicking of the OK button thereof. Thus, scale setting is completed.

Next, ROI Manager is selected from the Tools of the Analyze menu, and check marks are placed in check boxes "Show All" and "Labels" in a newly opened ROI Manager window. Subsequently, an imaginary straight line Li connecting the two points of Pa and Pb of intersections of a line Lf derived from the substantially flat surface and a line Lc derived from the curved surface of the fine particle or the external additive for a toner illustrated in each of FIG. 2A to FIG. 2D is drawn with the straight line tool (Straight Line) of the tool bar. Under the state, the Add of the ROI Manager window is selected. Next, a straight line perpendicular to the imaginary straight line Li in which a distance between two points become a maximum length "df", one of the two points being a point of intersection of the imaginary straight line L1 and the straight line, and another of the two points being a point of intersection of a line Lf derived from the substantially flat surface of the fine particle or the external additive for a toner and the straight line, is drawn, and the Add is selected. Further, a straight line Ls1 perpendicular to the imaginary straight line Li in which such a distance that one of distances Da and db becomes a maximum height "h", the distance Da being a distance between a point Pc and a point Pe, the point Pc being a point of intersection of the imaginary straight line Li and the straight line Ls1, and the point Pe being a point of intersection of the line Lc derived from the curved surface and the straight line Ls1, the distance db being a distance between a point Pd and the point Pe, and the point Pd being a point of intersection of the line Lf derived from the substantially flat surface and the straight line Ls1, the point Pe being a point of intersection of the line Lc derived from the curved surface and the straight line Ls1. After that, when the Measure of the ROI Manager window is selected, analysis is performed. Lengths corresponding to the maximum length df and the maximum height "h" are obtained from a newly opened Results window, and the ratio df/h is calculated.

In addition, the ellipse e1 that passes through the two points of intersection of the substantially flat surface and curved surface of the fine particle or the external additive for a toner, and is circumscribed on the curved surface of the fine particle or the external additive for a toner, and the ellipse e2 that passes through the two points of intersection of the substantially flat surface and curved surface of the fine particle or the external additive for a toner, and is inscribed on the curved surface of the fine particle or the external additive for a toner, the ellipses being illustrated in each of FIG. 2E and FIG. 2F, are drawn with the elliptical shape tool (Elliptical selections) of the tool bar. Under the state, the Add of the ROI Manager window is selected. Subsequently, straight lines serving as the long axis l1 and short axis s1 of the ellipse e1, and the long axis l2 and short axis s2 of the ellipse e2 are drawn with the straight line tool (Straight Line) of the tool bar as illustrated in each of FIG. 2E' and FIG. 2F', and the Add is selected. Next, when the Measure of the ROI Manager window is selected, analysis is performed. Lengths corresponding to the long axis l1 of the ellipse e1, the long axis l2 of the ellipse e2, the short axis s1 of the ellipse e1, and the short axis s2 of the ellipse e2 are obtained from a newly opened Results window, and the ratio l1/l2 and the ratio s1/s2 are calculated.

The above-mentioned procedure is performed on 100 fine particles or 100 particles of the external additive for a toner to be evaluated, and the number-average values of the ratio df/h, the ratio l1/l2, and the ratio s1/s2 are calculated.

The fine particle or the external additive for a toner that was able to be recognized to satisfy the following two points by the above-mentioned approach is judged to be a substantially hemispherical shape: (1) the number-average value of the ratio df/h is 0.00 to 0.10; and (2) the number-average value of the ratio l1/l2 is 0.90 to 1.10, and the number-average value of the ratio s1/s2 is 0.90 to 1.10.

<Method of Calculating Number-Average Value of Longest Diameter "w" of Substantially Flat Surface of Fine Particle or External Additive for Toner>

The number-average value of the longest diameter "w" of the substantially flat surface of the fine particle or the external additive for a toner is calculated with a scanning electron microscope (SEM).

The SEM apparatus, and a method and conditions for observation are as described below.

Apparatus: An Ultra-High Resolution Field Emission Scanning Electron Microscope S-4800 Manufactured by Hitachi High-Technologies Corporation (Hereinafter Referred to as "S-4800")

(1) Sample Production

A conductive paste (product number: 16053, manufactured by TED PELLA, Inc., PELCO Colloidal Graphite, Isopropanol base) is thinly applied to a sample stage (aluminum sample stage measuring 15 mm by 6 mm), and the toner, or the fine particle or the external additive for a toner is sprayed thereonto. Further, air is blown to remove an extra fine particle or an extra external additive for a toner from the sample stage, and then platinum is deposited from the vapor onto the remainder at 15 mA for 15 seconds. The sample stage is set in a sample holder, and the height of the sample stage is regulated to 30 mm with a sample height gauge.

(2) Setting of Conditions for Observation with S-4800

Liquid nitrogen is injected into an anticontamination trap mounted on the casing of the S-4800 until the liquid nitrogen flows out, followed by standing for 30 minutes. The "PC- SEM" of the S-4800 is activated to perform flushing (the cleaning of a FE chip that is an electron source). The acceleration voltage-displaying portion of a control panel on the screen of the S-4800 is clicked, and the [Flushing] button thereof is pressed to open a flushing performance dialog. The fact that a flushing intensity is 2 is recognized, and the flushing is performed. The fact that an emission current caused by the flushing is 20 to 40 µA is recognized. The sample holder is inserted into the sample chamber of the casing of the S-4800. An [Origin] button on the control panel is pressed to move the sample holder to an observation position.

The acceleration voltage-displaying portion is clicked to open a HV setting dialog, and an acceleration voltage and the emission current are set to [2.0 kV] and [10 µA], respectively. In the [Basics] tab of the operation panel of the S-4800, a signal selection mode is set to [SE], and a SE detector is brought into a mode for observing a reflected electron image by selecting [Low (L)]. Similarly in the [Basics] tab of the operation panel, the probe current of an electron optical system condition block is set to [Normal], the focus mode thereof is set to [UHR], and the WD thereof is set to [8.0 mm]. The [ON] button of the acceleration voltage-displaying portion of the control panel is pressed to apply the acceleration voltage to the sample.

(3) Focus Adjustment

An area in the magnification-displaying portion of the control panel is dragged to set a magnification to 5,000 (5 k). The focus knob [COARSE] of the operation panel is rotated, and when the sample is in focus to some extent, aperture alignment is adjusted. The [Align] of the control panel is clicked to display an alignment dialog, and [Beam] is selected. The STIGMA/ALIGNMENT knob (X, Y) of the operation panel is rotated to move a beam to be displayed to the center of a concentric circle.

Next, [Aperture] is selected, and the STIGMA/ALIGNMENT knob (X, Y) is rotated one by one to stop the movement of the image of the sample or to align the beam with the center so that the movement may be minimum. The aperture dialog is closed, and the sample is brought into focus by autofocusing. The operation is further repeated twice to bring the sample into focus. Under a state in which the middle point of the maximum diameter of the observed particle is aligned with the center of the measurement screen of the S-4800, the area in the magnification-displaying portion of the control panel is dragged to set the magnification to 10,000 (10 k). The focus knob [COARSE] of the operation panel is rotated, and when the sample is in focus to some extent, aperture alignment is adjusted. The [Align] of the control panel is clicked to display the alignment dialog, and [Beam] is selected. The STIGMA/ALIGNMENT knob (X, Y) of the operation panel is rotated to move a beam to be displayed to the center of a concentric circle.

Next, [Aperture] is selected, and the STIGMA/ALIGNMENT knob (X, Y) is rotated one by one to stop the movement of the image or to align the beam with the center so that the movement may be minimum. The aperture dialog is closed, and the sample is brought into focus by autofocusing. After that, the magnification is set to 50,000 (50 k), and focus adjustment is performed with the focus knob and the STIGMA/ALIGNMENT knob in the same manner as that described above, followed by bringing the sample into focus by autofocusing again. The operation is repeated again to bring the sample into focus.

(4) Image Storage

Brightness adjustment is performed by an ABC mode, and a size and the magnification are set to 640×480 pixels and 10,000 to 50,000 (10 to 50 k), respectively. The image of the fine particle or the external additive for a toner on the surface of each of the toner particles, or of the fine particle or the external additive for a toner on the surface of the sample stage is obtained from an upper direction (direction in which the substantially flat surface of the fine particle or the external additive for a toner can be observed in a projected image thereof), and is stored.

The number-average value of the longest diameter "w" of the substantially flat surface of the fine particle or the external additive for a toner is calculated from the resultant SEM image with image processing software ImageJ (developer: Wayne Rasband). Scale setting is performed as described above, and the number-average value of the longest diameter "w" of the substantially flat surface of the fine particle or the external additive for a toner is calculated by the following procedure.

The Set Measurements of the Analyze menu of the software is selected, and a check mark is placed in a check box "Feret's diameter." In addition, ROI Manager is selected from the Tools of the Analyze menu, and check marks are placed in check boxes "Show All" and "Labels" in a newly opened ROI Manager window. Subsequently, the substantially flat surface of one fine particle or one particle of the external additive for a toner is approximated to an ellipse with the elliptical shape tool (Elliptical selections) of the tool bar of the software as illustrated in FIG. 3. Under the state, the Add of the ROI Manager window is selected. The substantially flat surface of the fine particle or the external additive for a toner different from the selected fine particle or external additive for a toner is similarly approximated to an ellipse, and the Add is selected. After the operation has been repeated for all of the fine particles or the particles of the external additive for a toner in the image, when the Measure of the ROI Manager window is selected, analysis is performed. The longest diameter "w" (Feret) of the substantially flat surface of each fine particle or each particle of the external additive for a toner is obtained from a newly opened Results window. The longest diameter "w" of the substantially flat surface of the fine particle or the external additive for a toner thus obtained is the distance of the longest straight line out of straight lines each connecting arbitrary two points present on the outer periphery of the substantially flat surface of the fine particle or the external additive for a toner.

The above-mentioned procedure is performed on 100 fine particles to be evaluated, and the number-average value of the longest diameter "w" of the substantially flat surface of the fine particle or the external additive for a toner is calculated.

<Method of Recognizing Presence or Absence of Observation of Substantially Flat Surfaces of Fine Particles on Surfaces of Toner Particles>

Whether or not the substantially flat surfaces of the fine particles are observed on the surfaces of the toner particles is recognized with a scanning electron microscope (SEM).

The SEM apparatus, and a method and conditions for observation are as described above except that an image is obtained by observing the surface of each of the toner particles from an arbitrary one direction.

When the angle of each of the fine particles in a state in which the substantially flat surfaces of the fine particles are in contact with the surface of the toner particle is defined as 0°, what percentage the number of the fine particles each having an angle of more than 90° and less than 270° accounts for the number of the fine particles present on the surface of the toner particle is calculated from the resultant SEM image. The counting is performed on 200 fine particles present on the surface of the toner particle. Examples of the angle of the fine particle when the surface of the toner particle is observed from a lateral direction are illustrated in FIG. 4.

When it is recognized by the above-mentioned approach that the fine particles each having an angle of more than 90° and less than 270° account for 1.0 number % or more of the fine particles present on the surface of the toner particle, it is judged that the substantially flat surfaces of the fine particles are observed on the surface of the toner particle.

<Method of Calculating Number-Average Value of Ratio h/b of Maximum Height "h" to Maximum Width "b">

The number-average value of the ratio h/b defined as follows at the time of the observation of a section of the fine particle or the external additive for a toner is calculated with a scanning transmission electron microscope (STEM): in a straight line perpendicular to a straight line connecting the two points of intersection of the substantially flat surface and curved surface of the fine particle or the external additive for a toner, the height at which a distance between the point of intersection of the straight line connecting the two points of intersection of the substantially flat surface and the curved surface, and the straight line, and the point of intersection of the curved surface and the straight line, or a distance between the point of intersection of the substantially flat surface and the straight line, and the point of intersection of the curved surface and the straight line becomes maximum is defined as the maximum height "h", and the width at which a distance between the two points of intersection of a straight line parallel to the straight line connecting the two points of intersection of the substantially flat surface and the curved surface with the curved surface becomes maximum is defined as the maximum width "b".

The preparation of a sample for STEM observation, the STEM apparatus, and a method and conditions for the observation are as described above.

The number-average value of the ratio h/b of the fine particle or the external additive for a toner is calculated from the resultant STEM image with image processing software ImageJ (developer: Wayne Rasband). Scale setting is performed as described above, and a subsequent procedure is as described below.

ROI Manager is selected from the Tools of the Analyze menu of the software, and check marks are placed in check boxes "Show All" and "Labels" in a newly opened ROI Manager window. Subsequently, a straight line Ls1 which shows the maximum height "h" is drawn similarly as explained in the foregoing. Under the state, the Add of the ROI Manager window is selected. Next, a straight line Ls2 parallel to the imaginary straight line Li and perpendicular to the imaginary straight line Li showing the maximum height "h", in which such a distance Dc that becomes a maximum width "b", the distance Dc being a distance between two points Pf and Pg of intersection of the straight line Ls2 and the line Lc, is drawn as illustrated in each of FIG. 2A to FIG. 2D, and the Add is selected. After that, when the Measure of the ROI Manager window is selected, analysis is performed. Lengths corresponding to the maximum height "h" and the maximum width "b" are obtained from a newly opened Results window, and the ratio h/b is calculated.

The above-mentioned procedure is performed on 100 fine particles or 100 particles of the external additive for a toner to be evaluated, and the number-average value of the ratio h/b is calculated.

<Method of Recognizing Structures Represented by Formulae (D), (T), and (Q)>

The fact that the fine particle or external additive for a toner of the present invention includes at least one of the structures represented by the formula (D), the formula (T), and the formula (Q) is recognized with a nuclear magnetic resonance apparatus (NMR).

In the case of the fine particle or the external additive for a toner, the fine particle or the external additive is used as it is as a sample for NMR measurement. In the case of the toner, a sample is prepared by, for example, separating the fine particles as described below.

160 g of sucrose (manufactured by Kishida Chemical Co., Ltd.) is loaded into 100 mL of ion-exchanged water, and is dissolved while being heated in a water bath. Thus, a sucrose concentrated solution is prepared. 31 g of the sucrose concentrated solution and 6 mL of Contaminon N (10 mass % aqueous solution of a neutral detergent for washing a precision measuring device formed of a nonionic surfactant, an anionic surfactant, and an organic builder, and having a pH of 7, manufactured by Wako Pure Chemical Industries, Ltd.) are loaded into a centrifugation tube (volume: 50 ml). 1.0 g of the toner is added to the mixture, and a toner lump is broken with a spatula or the like. The centrifugation tube is shaken with a shaker (product name: AS-1N, sold by As One Corporation) at 300 strokes per min (spm) for 20 minutes. After the shaking, the solution is transferred into a glass tube for a swing rotor (50 mL), and is centrifuged with a centrifugal separator (product name: H-9R, manufactured by Kokusan Co., Ltd.) under the conditions of 3,500 rpm and 30 minutes.

Through the operation, the toner particles and the fine particles are separated from each other. It is visually recognized that the toner and the aqueous solution have been sufficiently separated from each other, and the toner separated into the uppermost layer is removed. The aqueous solution is subjected to centrifugation or the like, and the fine particles are separated to be collected. The resultant is dried with a drier for 1 hour or more. Thus, the measurement sample is obtained. A required amount is secured by performing the operation a plurality of times.

In the structures represented by the formula (D), the formula (T), and the formula (Q), Ra, Rb, and Rc bonded to silicon atoms are identified by $^{13}$C-NMR (solid) measurement. Conditions for the measurement are described below.

"$^{13}$C-NMR (Solid) Measurement Conditions"

Apparatus: JNM-ECX 500 II manufactured by JEOL Resonance Inc.
Sample tube: 3.2 mmφ
Sample: 150 mg of the fine particle or the external additive for a toner
Measurement temperature: room temperature
Pulse mode: CP/MAS
Measured nucleus frequency: 123.25 MHz ($^{13}$C)
Reference substance: adamantane (external reference: 29.5 ppm)
Sample spinning rate: 20 kHz
Contact time: 2 ms
Delay time: 2 s
Number of scans: 1,024 scans In the structures represented by the formula (D), the formula (T), and the formula (Q), the presence of Ra, Rb, and Rc is recognized by the presence or absence of signals resulting from, for example, the following organic groups: an alkyl group, such as a methyl group (Si—$CH_3$), an ethyl group (Si—$C_2H_5$), a propyl group (Si—$C_3H_7$), a butyl group (Si—$C_4H_9$), a pentyl group (Si—$C_5H_{11}$), a hexyl group (Si—C$_6$H$_{13}$), a heptyl group (Si—C$_7$H$_{15}$), or an octyl group (Si—C$_8$H$_{17}$); an aryl group, such as a phenyl group (Si—C$_6$H$_5$—); an alkylene group, such as a methine group (>CH—Si), a methylene group (Si—CH$_2$—), an ethylene group (Si—C$_2$H$_4$—), or a trimethylene group (Si—C$_3$H$_6$—); and an arylene group, such as a phenylene group (Si—C$_6$H$_4$—), each of which is bonded to a silicon atom.

In the structures represented by the formula (D), the formula (T), and the formula (Q), siloxane bond moieties were identified by $^{29}$Si-NMR (solid) measurement. Conditions for the measurement are described below.

"$^{29}$Si-NMR (Solid) Measurement Conditions"
Apparatus: JNM-ECX 500 II manufactured by JEOL Resonance Inc.
Sample tube: 3.2 mmφ
Sample: 150 mg of the fine particle or the external additive for a toner
Measurement temperature: room temperature
Pulse mode: CP/MAS
Measured nucleus frequency: 97.38 MHz ($^{29}$Si)
Reference substance: DSS (external reference: 1.534 ppm)
Sample spinning rate: 10 kHz
Contact time: 10 ms
Delay time: 2 s
Number of scans: 2,000 to 8,000 scans After the measurement, a plurality of silane components having different substituents and different bonded groups in the fine particle or the external additive for a toner are subjected to peak separation into an X1 structure, an X2 structure, an X3 structure, and an X4 structure by curve fitting, and the areas of the respective peaks are calculated.

X1 structure represented by the formula (1): (Rd)(Re)(Rf)SiO$_{1/2}$
X2 structure represented by the formula (2): (Rg)(Rh)Si(O$_{1/2}$)$_2$
X3 structure represented by the formula (3): RiSi(O$_{1/2}$)$_3$
X4 structure represented by the formula (4): Si(O$_{1/2}$)$_4$

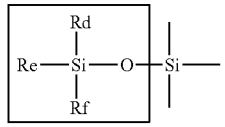

(1)

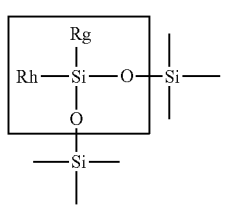

(2)

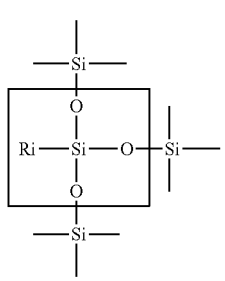

(3)

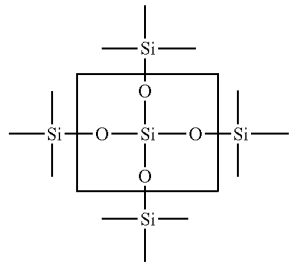

(4)

In the formulae (1) to (4), Rd, Re, Rf, Rg, Rh, and Ri each represent an organic group, a halogen atom, a hydroxy group, an acetoxy group, or an alkoxy group bonded to a silicon atom.

In the formulae (1) to (4), the structures of portions surrounded by quadrangles are the X1 structure to the X4 structure, respectively.

In a chart obtained by the $^{29}$Si-NMR measurement of the fine particle or the external additive for a toner, the ratio of the peak areas of the X2 structure to the X4 structure assigned to the structures represented by the formula (D), the formula (T), and the formula (Q) to the total peak area of an organosilicon polymer is preferably 50 mol % or more, more preferably 70 mol % or more.

When the structures represented by the formula (D), the formula (T), and the formula (Q) need to be identified in more detail, the identification may be performed by using the result of $^1$H-NMR measurement in combination with the results of the $^{13}$C-NMR measurement and the $^{29}$Si-NMR measurement.

According to the present invention, there can be provided the toner that is excellent in low-temperature fixability and can maintain its initial cleaning property even after having continuously received a mechanical stress, the external additive for a toner, and the fine particle.

EXAMPLES

The present invention is described below in more detail by way of specific production examples, Examples, and Comparative Examples. However, the present invention is by no means limited thereto. The term "part(s)" in the following formulations means "part(s) by mass" unless otherwise stated.

[Production Example of Substantially Hemispherical Fine Particles 1]
<Step of Preparing Precursor Aqueous Solution 1>

60.0 parts of ion-exchanged water was weighed in a reaction vessel including a stirring machine and a temperature gauge, and its pH was adjusted to 3.0 with 10 mass % hydrochloric acid. While the resultant was stirred, heating was performed to set its temperature to 60° C. After that, 40.0 parts of methyltrimethoxysilane was added to the heated product, and the mixture was stirred for 2 hours. The fact that an oil layer and a water layer were not separated from each other but mixed into one layer was visually observed, and then the mixture was cooled to provide a precursor aqueous solution 1.

<Polymerizing Step>

1,000.0 parts of ion-exchanged water was weighed in a reaction vessel including a stirring machine and a temperature gauge, and 6.0 parts of NOIGEN EA177 (manufactured by DKS Co., Ltd.) and 380.0 parts of PMMA particles (non-crosslinkable, number-average particle diameter: 10 μm) were loaded thereinto. While the mixture was stirred at 180 rpm, heating was performed to set its temperature to 50° C., and the mixture was held at the temperature for 30 minutes. While the stirring was continued, 34.0 parts of the precursor aqueous solution 1 was added to the mixture. The resultant was held as it was for 30 minutes, and then its pH was adjusted to 9.0 with an aqueous solution of sodium hydroxide. The resultant was further held as it was for 300 minutes to form, on the surfaces of the PMMA particles, substantially hemispherical fine particles each formed of an organosilicon polymer.

<Washing Step>

After the completion of the polymerizing step, the reaction solution was cooled, and was subjected to solid-liquid separation with a pressure filter to provide a cake of the PMMA particles. The cake was re-slurried with ion-exchanged water to provide a dispersed liquid again, and then the dispersed liquid was subjected to solid-liquid separation with the filter again. The re-slurrying and the solid-liquid separation were repeated several times, and then the resultant was finally subjected to solid-liquid separation to provide a cake of the PMMA particles.

<Separating and Drying Step>

After the completion of the washing step, the cake of the PMMA particles was loaded into 1,000.0 parts of acetone in a reaction vessel including a stirring machine, and the mixture was held for 1 hour while being stirred at 180 rpm. The fact that the PMMA particles were sufficiently dissolved was visually observed, and then the mixture was subjected to centrifugation treatment at 15,000 rpm for 10 minutes. The precipitate was recovered and dried in a vacuum. The dried product was subjected to shredding treatment with a pulverizer (manufactured by Hosokawa Micron Corporation) as required, and the substantially hemispherical fine particles were separated with a pneumatic classifier. Thus, substantially hemispherical fine particles 1 were obtained. The physical properties of the resultant substantially hemispherical fine particles 1 are shown in Table 2.

[Production Examples of Substantially Hemispherical Fine Particles 2 to 20, and Comparative Substantially Hemispherical Fine Particles 1 and 2]

Substantially hemispherical fine particles 2 to 20, and comparative substantially hemispherical fine particles 1 and 2 were obtained in the same manner as in the production example of the substantially hemispherical fine particles 1 except that formulations and production conditions shown in Table 1 were adopted. The physical properties of the resultant fine particles are shown in Table 2.

TABLE 1

| | Monomer 1 | | Monomer 2 | | Substrate | |
|---|---|---|---|---|---|---|
| | Kind | Number of parts in step of preparing precursor aqueous solution (part(s)) | Kind | Number of parts in step of preparing precursor aqueous solution (part(s)) | Material | Particle diameter |
| Substantially hemispherical fine particles 1 | Methyl-trimethoxysilane | 40.0 | — | — | PMMA particles | 10 μm |
| Substantially hemispherical fine particles 2 | Methyl-trimethoxysilane | 40.0 | — | — | PMMA particles | 10 μm |
| Substantially hemispherical fine particles 3 | Methyl-trimethoxysilane | 40.0 | — | — | PMMA particles | 10 μm |
| Substantially hemispherical fine particles 4 | Methyl-trimethoxysilane | 40.0 | — | — | PMMA particles | 10 μm |
| Substantially hemispherical fine particles 5 | Methyl-trimethoxysilane | 40.0 | — | — | PMMA particles | 10 μm |
| Substantially hemispherical fine particles 6 | Methyl-trimethoxysilane | 40.0 | — | — | PMMA particles | 10 μm |
| Substantially hemispherical fine particles 7 | Methyl-trimethoxysilane | 40.0 | — | — | PMMA particles | 10 μm |
| Substantially hemispherical fine particles 8 | Methyl-trimethoxysilane | 40.0 | — | — | PMMA particles | 10 μm |
| Substantially hemispherical fine particles 9 | Methyl-trimethoxysilane | 40.0 | — | — | PMMA particles | 10 μm |
| Substantially hemispherical fine particles 10 | Methyl-trimethoxysilane | 40.0 | — | — | PMMA particles | 10 μm |
| Substantially hemispherical fine particles 11 | Methyl-trimethoxysilane | 40.0 | — | — | PMMA particles | 10 μm |
| Substantially hemispherical fine particles 12 | Methyl-trimethoxysilane | 30.0 | Dimethyl-dimethoxysilane | 10.0 | PMMA particles | 10 μm |
| Substantially hemispherical fine particles 13 | Methyl-trimethoxysilane | 40.0 | — | — | PMMA particles | 10 μm |
| Substantially hemispherical fine particles 14 | Methyl-trimethoxysilane | 30.0 | Titanium n-propoxide | 10.0 | PMMA particles | 10 μm |
| Substantially hemispherical fine particles 15 | Tetra-ethoxysilane | 40.0 | — | — | PMMA particles | 10 μm |
| Substantially hemispherical fine particles 16 | Methyl-trimethoxysilane | 30.0 | Tetraethoxysilane | 10.0 | PMMA particles | 10 μm |
| Substantially hemispherical fine particles 17 | Methyl-trimethoxysilane | 30.0 | 3-Methacryloxypropyl-trimethoxysilane | 10.0 | PMMA particles | 10 μm |
| Substantially hemispherical fine particles 18 | Methyl-trimethoxysilane | 30.0 | Tetraethoxysilane | 10.0 | PMMA particles | 4 μm |
| Substantially hemispherical fine particles 19 | Octyl-triethoxysilane | 40.0 | — | — | PMMA particles | 10 μm |
| Substantially hemispherical fine particles 20 | Dimethyl-dimethoxysilane | 40.0 | — | — | PMMA particles | 10 μm |

TABLE 1-continued

| | | | | | | |
|---|---|---|---|---|---|---|
| Comparative substantially hemispherical fine particles 1 | Methyl-trimethoxysilane | 40.0 | — | | — | PMMA particles | 10 μm |
| Comparative substantially hemispherical fine particles 2 | Methyl-trimethoxysilane | 40.0 | — | | — | PMMA particles | 10 μm |
| Hollow fine particles | | | Described in the text | | | |
| Spherical sol-gel silica fine particles | | | | | | |
| Fumed silica fine particles | | | | | | |

| | Polymerization condition | | | |
|---|---|---|---|---|
| | pH | Temperature (°C.) | Time period after pH adjustment (h.) | Number of parts of added precursor aqueous solution (part(s)) |
| Substantially hemispherical fine particles 1 | 9.0 | 50 | 5 | 34.0 |
| Substantially hemispherical fine particles 2 | 9.0 | 50 | 5 | 56.0 |
| Substantially hemispherical fine particles 3 | 9.0 | 50 | 5 | 82.0 |
| Substantially hemispherical fine particles 4 | 9.0 | 50 | 5 | 91.0 |
| Substantially hemispherical fine particles 5 | 9.0 | 50 | 5 | 25.0 |
| Substantially hemispherical fine particles 6 | 9.0 | 50 | 5 | 15.0 |
| Substantially hemispherical fine particles 7 | 9.0 | 50 | 5 | 12.0 |
| Substantially hemispherical fine particles 8 | 9.0 | 50 | 5 | 91.0 |
| Substantially hemispherical fine particles 9 | 9.0 | 50 | 5 | 91.0 |
| Substantially hemispherical fine particles 10 | 9.0 | 50 | 5 | 91.0 |
| Substantially hemispherical fine particles 11 | 9.0 | 80 | 5 | 91.0 |
| Substantially hemispherical fine particles 12 | 9.0 | 80 | 5 | 91.0 |
| Substantially hemispherical fine particles 13 | 9.0 | 30 | 5 | 34.0 |
| Substantially hemispherical fine particles 14 | 9.0 | 30 | 5 | 34.0 |
| Substantially hemispherical fine particles 15 | 9.0 | 30 | 5 | 34.0 |
| Substantially hemispherical fine particles 16 | 9.0 | 30 | 5 | 91.0 |
| Substantially hemispherical fine particles 17 | 9.0 | 50 | 5 | 34.0 |
| Substantially hemispherical fine particles 18 | 9.0 | 30 | 5 | 228.0 |
| Substantially hemispherical fine particles 19 | 9.0 | 50 | 5 | 91.0 |
| Substantially hemispherical fine particles 20 | 9.0 | 50 | 5 | 91.0 |
| Comparative substantially hemispherical fine particles 1 | 9.0 | 50 | 5 | 10.0 |
| Comparative substantially hemispherical fine particles 2 | 9.0 | 50 | 5 | 98.0 |
| Hollow fine particles | | Described in the text | | |
| Spherical sol-gel silica fine particles | | | | |
| Fumed silica fine particles | | | | |

TABLE 2

| | Solid | Number-average value of ratio df/h | Number-average value of ratio l1/l2 | Number-average value of ratio s1/s2 | Substantially hemispherical shape | Number-average value of longest diameter "w" (nm) | Number-average value of ratio h/b | Structures represented by formulae (D), (T), and (Q) |
|---|---|---|---|---|---|---|---|---|
| Substantially hemispherical fine particles 1 | ○ | 0.02 | 0.93 | 1.04 | ○ | 88 | 0.55 | Formula (T) |
| Substantially hemispherical fine particles 2 | ○ | 0.05 | 0.96 | 1.08 | ○ | 233 | 0.51 | Formula (T) |

TABLE 2-continued

| | Solid | Number-average value of ratio df/h | Number-average value of ratio l1/l2 | Number-average value of ratio s1/s2 | Substantially hemispherical shape | Number-average value of longest diameter "w" (nm) | Number-average value of ratio h/b | Structures represented by formulae (D), (T), and (Q) |
|---|---|---|---|---|---|---|---|---|
| Substantially hemispherical fine particles 3 | ○ | 0.02 | 1.03 | 0.92 | ○ | 291 | 0.54 | Formula (T) |
| Substantially hemispherical fine particles 4 | ○ | 0.03 | 1.03 | 0.95 | ○ | 385 | 0.60 | Formula (T) |
| Substantially hemispherical fine particles 5 | ○ | 0.02 | 0.98 | 1.04 | ○ | 54 | 0.49 | Formula (T) |
| Substantially hemispherical fine particles 6 | ○ | 0.05 | 1.10 | 0.95 | ○ | 31 | 0.56 | Formula (T) |
| Substantially hemispherical fine particles 7 | ○ | 0.02 | 1.09 | 0.93 | ○ | 16 | 0.55 | Formula (T) |
| Substantially hemispherical fine particles 8 | ○ | 0.05 | 1.05 | 0.90 | ○ | 389 | 0.52 | Formula (T) |
| Substantially hemispherical fine particles 9 | ○ | 0.02 | 0.97 | 1.10 | ○ | 377 | 0.50 | Formula (T) |
| Substantially hemispherical fine particles 10 | ○ | 0.03 | 0.91 | 1.02 | ○ | 381 | 0.57 | Formula (T) |
| Substantially hemispherical fine particles 11 | ○ | 0.03 | 1.01 | 0.95 | ○ | 365 | 0.74 | Formula (T) |
| Substantially hemispherical fine particles 12 | ○ | 0.03 | 0.97 | 1.02 | ○ | 333 | 0.81 | Formula (D) and Formula (T) |
| Substantially hemispherical fine particles 13 | ○ | 0.04 | 0.98 | 1.08 | ○ | 95 | 0.34 | Formula (T) |
| Substantially hemispherical fine particles 14 | ○ | 0.02 | 0.92 | 1.06 | ○ | 111 | 0.28 | Formula (T) |
| Substantially hemispherical fine particles 15 | ○ | 0.04 | 0.90 | 1.05 | ○ | 143 | 0.21 | Formula (Q) |
| Substantially hemispherical fine particles 16 | ○ | 0.05 | 1.05 | 0.99 | ○ | 370 | 0.29 | Formula (T) and Formula (Q) |
| Substantially hemispherical fine particles 17 | ○ | 0.03 | 1.02 | 0.91 | ○ | 97 | 0.35 | Formula (T) |
| Substantially hemispherical fine particles 18 | ○ | 0.10 | 0.93 | 1.05 | ○ | 370 | 0.28 | Formula (T) and Formula (Q) |
| Substantially hemispherical fine particles 19 | ○ | 0.03 | 0.92 | 1.09 | ○ | 340 | 0.85 | Formula (T) |
| Substantially hemispherical fine particles 20 | ○ | 0.02 | 0.90 | 1.05 | ○ | 328 | 0.87 | Formula (D) |
| Comparative substantially hemispherical fine particles 1 | ○ | 0.03 | 0.96 | 1.07 | ○ | 8 | 0.59 | Formula (T) |
| Comparative substantially hemispherical fine particles 2 | ○ | 0.05 | 1.06 | 0.98 | ○ | 427 | 0.51 | Formula (T) |
| Hollow fine particles | x | 0.80 | 0.96 | 1.08 | x | 359 | 0.26 | Formula (T) and Formula (Q) |
| Spherical sol-gel silica fine particles | ○ | (Incalculable) | (Incalculable) | (Incalculable) | x | 110 | (Incalculable) | Formula (Q) |
| Fumed silica fine particles | ○ | (Incalculable) | (Incalculable) | (Incalculable) | x | 135 | (Incalculable) | Formula (Q) |

In Table 2, the symbol "○" in the column "Solid" means that the fine particles are solid, and the symbol "x" therein means that the fine particles are hollow. In addition, the symbol "○" in the column "Substantially hemispherical shape" means that the fine particles are a substantially hemispherical shape, and the symbol "x" therein means that the fine particles are not a substantially hemispherical shape.

[Production Example of Hollow Fine Particles]

500 g of ion-exchanged water was loaded into a reaction vessel, and 0.45 g of a 48% aqueous solution of sodium hydroxide was added to the water to provide an aqueous solution. 65 g of methyltrimethoxysilane and 50 g of tetraethoxysilane were added to the aqueous solution, and a hydrolysis reaction was performed by stirring the mixture for 1 hour while keeping its temperature at 13 to 15° C. Further, 0.31 g of a 15% aqueous solution of α-(p-nonylphenyl)-w-hydroxy(polyoxyethylene) was added to the hydrolysate, and then a hydrolysis reaction was performed by stirring the mixture at the temperature for 3 hours. Thus, a transparent reaction product containing a silanol compound was obtained. Next, while the pH of the resultant reaction product was kept as it was, its temperature was held at 70° C., and a condensation reaction was performed by stirring the product for 5 hours. Thus, an aqueous suspension containing hollow fine particles each formed of an organosilicon compound was obtained. The aqueous suspension was filtered through a membrane filter, and a liquid portion that had passed through the filter was subjected to a centrifugal separator so that white fine particles were separated. The separated white fine particles were washed with water, and were dried with hot air at a temperature of 150° C. for 5 hours to provide hollow fine particles. The physical properties of the resultant hollow fine particles are shown in Table 2.

[Production Example of Spherical Sol-Gel Silica Fine Particles]

500.0 g of methanol, 36.0 g of water, and 41.0 g of 28 mass % ammonia water were loaded into a glass-made reactor including a stirring machine, a dropping funnel, and a temperature gauge, and were mixed. The temperature of the resultant solution was adjusted to 35° C., and the addition of 932.0 g of tetramethoxysilane and the addition of 335.0 g of 5.5 mass % ammonia water were simultaneously started while the solution was stirred. Tetramethoxysilane was dropped over 6 hours, and ammonia water was dropped over 5 hours. After the completion of the dropping of tetramethoxysilane, hydrolysis was performed by further continuing the stirring for 0.5 hour. Thus, a dispersed liquid of hydrophilic spherical sol-gel silica fine particles in methanol and water was obtained. Next, an ester adapter and a cooling tube were mounted on the glass-made reactor, and the dispersed liquid was sufficiently dried at a temperature of 80° C. under reduced pressure. The resultant silica fine particles were heated in a thermostat at a temperature of 400° C. for 10 minutes.

The resultant silica fine particles were subjected to shredding treatment with a pulverizer (manufactured by Hosokawa Micron Corporation).

After that, 500 g of the silica fine particles were loaded into a polytetrafluoroethylene inner cylinder-type stainless-steel autoclave having an internal volume of 1,000 ml. The inside of the autoclave was purged with a nitrogen gas, and then 0.5 g of hexamethyldisilazane (HMDS) and 0.1 g of water were uniformly sprayed with a two-fluid nozzle in a mist manner onto the silica powder while a stirring blade attached to the autoclave was rotated at 6.6 s$^{-1}$ (number of revolutions). After the powder had been stirred for 30 minutes, the autoclave was hermetically sealed, and the powder was heated at a temperature of 220° C. for 2 hours. Subsequently, while the heating was performed, a pressure in the system was reduced, and deammoniation treatment was performed. Thus, spherical sol-gel silica fine particles were obtained. The physical properties of the resultant spherical sol-gel silica fine particles are shown in Table 2.

[Production Example of Fumed Silica Fine Particles]

Commercial silica fine particles having a BET specific surface area of 30 m$^2$/g were passed through an atmosphere at a temperature of 1,800° C., which had been established with a burner, at a rate of 0.5 kg/hr, and the silica particles were blown into a collection line and a filter with a blower to be collected. After that, the collected particles were subjected to surface treatment with 8 parts by mass of hexamethyldisilazane, and were then classified with a pneumatic classifier. Thus, fumed silica fine particles were obtained. The physical properties of the resultant fine particles are shown in Table 2.

[Production Example of Toner Particles 1]

<Aqueous Medium-Preparing Step>

14.0 parts of sodium phosphate (manufactured by Rasa Industries, Ltd., dodecahydrate) was loaded into 1,000.0 parts of ion-exchanged water in a reaction vessel, and the temperature of the mixture was kept at 65° C. for 1 hour while the inside of the vessel was purged with nitrogen. While the mixture was stirred with T.K. HOMO MIXER (manufactured by Tokushu Kika Kogyo Co., Ltd.) at 12,000 rpm, an aqueous solution of calcium chloride obtained by dissolving 9.2 parts of calcium chloride (dihydrate) in 10.0 parts of ion-exchanged water were collectively loaded into the mixture to prepare an aqueous medium containing a dispersion stabilizer. Further, 10 mass % hydrochloric acid was loaded into the aqueous medium to adjust its pH to 6.0. Thus, an aqueous medium was obtained.

<Polymerizable Monomer Composition-Preparing Step>

| Styrene: | 60.0 parts |
| C.I. Pigment Blue 15:3: | 6.5 parts |

The above-mentioned materials were loaded into an attritor (manufactured by Mitsui Miike Chemical Engineering Machinery, Co., Ltd.), and were dispersed with zirconia particles each having a diameter of 1.7 mm at 220 rpm for 5 hours to prepare a pigment-dispersed liquid. The following materials were added to the pigment-dispersed liquid.

| Styrene: | 11.0 parts |
| n-Butyl acrylate: | 29.0 parts |
| Crosslinking agent (divinylbenzene): | 0.2 part |
| Saturated polyester resin: | 6.0 parts |

(condensation polymerization product of propylene oxide-modified bisphenol A (2 mol adduct) and terephthalic acid (molar ratio: 10:12), glass transition temperature Tg=68° C., weight-average molecular weight Mw=10,000, molecular weight distribution Mw/Mn=5.12).

| Fischer-Tropsch wax (melting point: 78° C.): | 10.0 parts |
| Charge control agent: | 0.5 part |
| (aluminum compound of 3,5-di-tert-butylsalicylic acid) | |

The temperature of the mixture was kept at 65° C., and the materials were uniformly dissolved and dispersed in the pigment-dispersed liquid with T.K. HOMO MIXER (manufactured by Tokushu Kika Kogyo Co., Ltd.) at 500 rpm to prepare a polymerizable monomer composition.

<Granulating Step>

While the temperature of the aqueous medium and the number of revolutions of the stirring apparatus were kept at 70° C. and 12,000 rpm, respectively, the polymerizable monomer composition was loaded into the aqueous medium, and 9.0 parts of t-butyl peroxypivalate that was a polymerization initiator was added to the mixture. The mixture was granulated for 10 minutes while the number of revolutions of the stirring apparatus was maintained as it was at 12,000 rpm.

<Polymerizing Step>

The stirring machine was changed from the high-speed stirring apparatus to a propeller stirring blade, and polymerization was performed for 5 hours by holding the temperature of the granulated product at 70° C. while stirring the granulated product at 150 rpm. The temperature was increased to 95° C., and the resultant was subjected to a polymerization reaction by being heated at the temperature for 5 hours. Thus, a slurry of toner particles was obtained.

<Washing and Drying Step>

After the completion of the polymerizing step, the slurry of the toner particles was cooled, and hydrochloric acid was added to the slurry of the toner particles to adjust the pH of the system to 1.5 or less, followed by stirring for 1 hour. After that, the mixture was subjected to solid-liquid separation with a pressure filter to provide a toner cake. The toner cake was re-slurried with ion-exchanged water to provide a dispersed liquid again, and then the dispersed liquid was subjected to solid-liquid separation with the pressure filter again. The re-slurrying and the solid-liquid separation were repeated until the electrical conductivity of the filtrate became 5.0 μS/cm or less. After that, the resultant was finally subjected to solid-liquid separation to provide a toner cake.

The resultant toner cake was dried with a flash dryer FLASH JET DRYER (manufactured by Seishin Enterprise Co., Ltd.), and fine powder and coarse powder were removed with a multidivision classifier utilizing a Coanda effect. Thus, toner particles 1 were obtained. The drying was performed under the conditions of a blowing temperature of 90° C. and a dryer outlet temperature of 40° C., and the rate at which the toner cake was supplied was adjusted in accordance with the water content of the toner cake to such a rate that the outlet temperature did not deviate from 40° C. The resultant toner particles 1 had a weight-average particle diameter of 6.2

[Production Example of Toner Particles 2]
<Step of Preparing Polyester Resin 1>

| Terephthalic acid: | 11.1 mol |
| Adduct of bisphenol A with 2 mol of propylene oxide (PO-BPA): | 10.9 mol |

The above-mentioned monomers were loaded into an autoclave together with an esterification catalyst, and the autoclave was mounted with a decompression apparatus, a water-separating apparatus, a nitrogen gas-introducing apparatus, a temperature-measuring apparatus, and a stirring apparatus. Under a nitrogen atmosphere, while a pressure in the autoclave was reduced, the mixture was subjected to a reaction in accordance with an ordinary method at a temperature of 215° C. until a Tg of 70° C. was obtained. Thus, a polyester resin 1 was obtained. The resultant polyester resin 1 had a weight-average molecular weight (Mw) of 7,930 and a number-average molecular weight (Mn) of 3,090.

<Step of Preparing Polyester Resin 2>

| Bisphenol A ethylene oxide 2 mol adduct: | 725 parts by mass |
| Phthalic acid: | 285 parts by mass |
| Dibutyltin oxide: | 2.5 parts by mass |

The above-mentioned materials were caused to react with each other for 7 hours by being stirred at a temperature of 220° C. Further, the resultant was subjected to a reaction under reduced pressure for 5 hours. After that, the resultant was cooled to 80° C. and added to a solution of 190 parts by mass of isophorone diisocyanate in ethyl acetate. After that, the mixture was subjected to a reaction for 2 hours to provide an isocyanate group-containing polyester resin. 25 parts by mass of the isocyanate group-containing polyester resin and 1 part by mass of isophorone diamine were caused to react with each other at a temperature of 50° C. for 2 hours by using part of the resultant reaction liquid as it was. Thus, a polyester resin 2 containing, as a main component, polyester containing a urea group was obtained. The resultant polyester resin 2 had a weight-average molecular weight (Mw) of 22,990, a number-average molecular weight (Mn) of 3,020, and a peak molecular weight of 6,810.

<Step of Preparing Toner Particles>

700 parts by mass of ion-exchanged water, 1,000 parts by mass of a 0.1 mol/l $Na_3PO_4$ aqueous solution, and 24.0 parts by mass of a 1.0 mol/l HCl aqueous solution were loaded into a five-necked pressure-resistant vessel including a reflux tube, a stirring machine, a temperature gauge, and a nitrogen introducing tube. The temperature of the mixture was kept at 63° C. while the mixture was stirred at 12,000 rpm with a high-speed stirring apparatus T.K. HOMO MIXER (manufactured by Tokushu Kika Kogyo Co., Ltd.). 85 parts by mass of a 1.0 mol/l $CaCl_2$) aqueous solution was gradually added to the resultant. Thus, an aqueous dispersion medium containing a fine poorly water-soluble dispersion stabilizer $Ca_3(PO_4)_2$ was prepared.

After that, a toner particle precursor composition was produced by using the following materials.

| Polyester Resin 1: | 60.0 parts by mass |
| Polyester Resin 2: | 40.0 parts by mass |
| Copper phthalocyanine pigment (Pigment Blue 15:3): | 6.5 parts by mass |
| Charge control agent: (aluminum compound of 3,5-di-tert-butylsalicylic acid) | 0.5 part by mass |
| Release agent (behenyl behenate): | 10.0 parts by mass |

The foregoing materials were dissolved in 400 parts by mass of toluene, and the temperature of the solution was increased to 63° C. Thus, a toner particle precursor composition was obtained.

Next, the toner particle precursor composition was loaded into the aqueous dispersion medium containing the fine poorly water-soluble dispersion stabilizer $Ca_3(PO_4)_2$, and the mixture was granulated for 5 minutes while being stirred with the high-speed stirring apparatus at 12,000 rpm. After that, the high-speed stirring apparatus was changed to a propeller-type stirring machine, and a temperature in the vessel was increased to 70° C. A time period required for the temperature increase was 10 minutes. Further, the granulated product was subjected to a reaction for 5 hours while being slowly stirred. After that, the temperature was increased to 95° C., and the resultant was subjected to a reaction by being heated at the temperature for 5 hours. Thus, a slurry of toner particles was obtained.

A washing and drying step after the completion of the reaction was performed in the same manner as in the production example of the toner particles 1 to provide toner particles 2. The resultant toner particles 2 had a weight-average particle diameter of 6.2 μm.

[Production Example of Toner Particles 3]

An aqueous medium-preparing step, a polymerizable monomer composition-preparing step, and a granulating step were performed in the same manner as in the production example of the toner particles 1.

<Step of Preparing Organosilicon Compound Aqueous Solution 1>

60.0 parts of ion-exchanged water was weighed in a reaction vessel including a stirring machine and a temperature gauge, and its pH was adjusted to 1.5 with 10 mass % hydrochloric acid. While the resultant was stirred, heating was performed to set its temperature to 80° C. After that, 40.0 parts of methyltriethoxysilane was added to the heated product, and the mixture was stirred for 5 minutes to provide an organosilicon compound aqueous solution 1.

<Polymerizing Step>

The stirring machine was changed from the high-speed stirring apparatus to a propeller stirring blade, and polymerization was performed for 5 hours by holding the temperature of the granulated product at 70° C. while stirring the granulated product at 150 rpm. The temperature was increased to 95° C., and the resultant was subjected to a polymerization reaction by being heated at the temperature for 5 hours. Thus, a slurry of toner particles was obtained. After that, the temperature of the slurry was cooled to 60° C., and its pH was measured. As a result, the pH was 5.0. While the stirring of the slurry was continued at a temperature of 60° C., 30.0 parts of the organosilicon compound aqueous solution 1 was added thereto. The slurry was held as it was for 30 minutes, and then its pH was adjusted to 9.0 with an aqueous solution of sodium hydroxide. The resultant was further held for 300 minutes to form an organosilicon polymer on each of the surfaces of toner particles.

A washing and drying step after the completion of the polymerizing step was performed in the same manner as in the production example of the toner particles 1 to provide toner particles 3. The resultant toner particles 3 had a weight-average particle diameter of 6.3 μm.

[Production Example of Toner 1]

100.0 parts of the toner particles 1 were dry-mixed with 2.0 parts of the substantially hemispherical fine particles 1 by using FM MIXER (manufactured by Nippon Coke & Engineering Co., Ltd.) for 5 minutes. Further, the externally added particles were sieved with a mesh having an aperture of 150 μm. Thus, a toner 1 was obtained. The physical properties of the resultant toner are shown in Table 3.

[Production Examples of Toners 2 to 22 and Comparative Toners 1 to 4]

Toners 2 to 22 and comparative toners 1 to 4 were obtained in the same manner as in the production example of the toner 1 except that formulations shown in Table 3 were adopted. The physical properties of the resultant toners are shown in Table 3.

[Comparative Toner 5]

The toner particles 3 were used as they were as a comparative toner 5.

TABLE 3

| | Toner particles | Fine particles 1 Kind | Number of parts | Fine particles 2 Kind | Number of parts | Presence or absence of observation of substantially flat surfaces | Number percent of fine particles whose substantially flat surfaces can be observed |
|---|---|---|---|---|---|---|---|
| Toner 1 | Toner particles 1 | Substantially hemispherical fine particles 1 | 2.0 | — | — | Present | 10.0 |
| Toner 2 | Toner particles 1 | Substantially hemispherical fine particles 2 | 2.0 | — | — | Present | 12.5 |
| Toner 3 | Toner particles 1 | Substantially hemispherical fine particles 3 | 2.0 | — | — | Present | 15.5 |
| Toner 4 | Toner particles 1 | Substantially hemispherical fine particles 4 | 2.0 | — | — | Present | 18.0 |
| Toner 5 | Toner particles 1 | Substantially hemispherical fine particles 5 | 2.0 | — | — | Present | 8.5 |
| Toner 6 | Toner particles 1 | Substantially hemispherical fine particles 6 | 2.0 | — | — | Present | 7.5 |
| Toner 7 | Toner particles 1 | Substantially hemispherical fine particles 7 | 2.0 | — | — | Present | 7.0 |
| Toner 8 | Toner particles 1 | Substantially hemispherical fine particles 8 | 2.0 | — | — | Present | 21.5 |
| Toner 9 | Toner particles 1 | Substantially hemispherical fine particles 9 | 3.0 | — | — | Present | 28.0 |
| Toner 10 | Toner particles 1 | Substantially hemispherical fine particles 10 | 4.0 | — | — | Present | 37.5 |
| Toner 11 | Toner particles 1 | Substantially hemispherical fine particles 11 | 4.0 | — | — | Present | 41.0 |
| Toner 12 | Toner particles 1 | Substantially hemispherical fine particles 12 | 4.0 | — | — | Present | 43.5 |
| Toner 13 | Toner particles 1 | Substantially hemispherical fine particles 13 | 2.0 | — | — | Present | 6.0 |
| Toner 14 | Toner particles 1 | Substantially hemispherical fine particles 14 | 2.0 | — | — | Present | 4.5 |
| Toner 15 | Toner particles 1 | Substantially hemispherical fine particles 15 | 2.0 | — | — | Present | 2.0 |
| Toner 16 | Toner particles 1 | Substantially hemispherical fine particles 16 | 2.0 | — | — | Present | 10.5 |
| Toner 17 | Toner particles 1 | Substantially hemispherical fine particles 17 | 2.0 | — | — | Present | 6.5 |
| Toner 18 | Toner particles 1 | Substantially hemispherical fine particles 18 | 2.0 | — | — | Present | 17.5 |
| Toner 19 | Toner particles 1 | Substantially hemispherical fine particles 18 | 1.0 | Spherical sol-gel silica fine particles | 1.0 | Present | 18.0 |
| Toner 20 | Toner particles 1 | Substantially hemispherical fine particles 15 | 0.5 | Spherical sol-gel silica fine particles | 1.0 | Present | 2.5 |
| Toner 21 | Toner particles 1 | Substantially hemispherical fine particles 18 | 0.1 | Spherical sol-gel silica fine particles | 1.9 | Present | 17.5 |
| Toner 22 | Toner particles 2 | Substantially hemispherical fine particles 1 | 2.0 | — | — | Present | 11.0 |
| Comparative Toner 1 | Toner particles 1 | Hollow fine particles | 1.0 | Spherical sol-gel silica fine particles | 1.0 | Present | 17.0 |
| Comparative Toner 2 | Toner particles 1 | Fumed silica fine particles | 0.5 | Spherical sol-gel silica fine particles | 1.0 | — | 0.0 |
| Comparative Toner 3 | Toner particles 1 | Comparative substantially hemispherical fine particles 1 | 2.0 | — | — | Present | 7.0 |
| Comparative Toner 4 | Toner particles 1 | Comparative substantially hemispherical fine particles 2 | 2.0 | — | — | Present | 18.5 |
| Comparative Toner 5 | Toner particles 3 | — | — | — | — | — | 0.0 |

[Image Output Evaluation]

<Evaluation of Cleaning Property>

A tandem-type laser beam printer manufactured by Canon Inc. (product name: LBP9600C, hereinafter sometimes referred to as "LBP9600C") was remodeled so as to be capable of performing printing only with a cyan station. A toner cartridge for the LBP9600C was filled with 120 g of a toner to be evaluated, and the entirety of the toner cartridge was left to stand under a low-temperature and low-humidity (L/L) (10° C./15% RH) environment for 24 hours. After having been left to stand for 24 hours, the toner cartridge was mounted on the LBP9600C, and a halftone image having a toner laid-on level of 0.25 mg/cm$^2$ was output on image-receiving paper 18. After that, an image having a print percentage of 1.0% was printed out on 14,000 sheets of A4 paper in a lateral direction. The image output was performed under a low-temperature and low-humidity environment (15° C./10% RH). The conditions are conditions severer for cleaning because the hardness of a cleaning blade becomes higher to reduce its followability to a photosensitive drum 1. After the output on the 14,000 sheets, a halftone image having a toner laid-on level of 0.25 mg/cm$^2$ was output on the image-receiving paper 18. The images and the contamination of a charging roller before the output on the 14,000 sheets (initial stage) and after the output on the 14,000 sheets (after an endurance evaluation) were evaluated based on the following criteria. CS-680 (sold by Canon Marketing Japan Inc., basis weight: 68 g/m$^2$) was used as the image-receiving paper 18.

A: No cleaning failure is present on the halftone image, and no contamination is present on the charging roller.

B: No cleaning failure is present on the halftone image, but contamination is present on the charging roller.

C: An extremely thin vertical line is observed as a cleaning failure on the halftone image.

D: One to nine clear vertical lines are observed as cleaning failures on the halftone image.

E: Ten or more clear vertical lines are observed as cleaning failures on the halftone image.

In the present invention, a criterion of C or more was judged to be satisfactory.

<Evaluation of Low-Temperature Fixability>

The fixing unit of the LBP9600C was remodeled so that its fixation temperature was able to be adjusted. Image output was performed with the LBP9600C after the remodeling at a process speed of 320 mm/sec while the fixation temperature was changed from 140° C. in increments of 5° C. The image output was performed under a low-temperature and low-humidity environment (15° C./10% RH) corresponding to conditions severer for low-temperature fixation because the fixing unit hardly warmed. A solid image having a toner laid-on level of 0.40 mg/cm$^2$ was formed on image-receiving paper with a toner to be evaluated, and was heated and pressurized in an oilless manner to form a fixed image on the image-receiving paper. The fixed image was rubbed with KimWipes (S-200, manufactured by Crecia Co., Ltd.) under a load of 75 g/cm$^2$ ten times, and the temperature at which the percentage by which the density of the image reduced after the rubbing as compared to that before the rubbing became less than 10% was defined as a fixation temperature, followed by an evaluation based on the following criteria.

A4 paper (product name: OceRedLabel, manufactured by Canon Inc., basis weight: 80 g/m$^2$) was used as the image-receiving paper. A color reflection densitometer X-RITE 404A (manufactured by X-Rite Inc.) was used in the image density measurement, and a density relative to a printed-out image in a white ground portion having an original density of 0.00 was measured, followed by the calculation of the percentage by which the image density reduced after the rubbing.

A: The fixation temperature is less than 150° C.

B: The fixation temperature is 150° C. or more and less than 156° C.

C: The fixation temperature is 156° C. or more and less than 162° C.

D: The fixation temperature is 162° C. or more and less than 170° C.

E: The fixation temperature is 170° C. or more.

In the present invention, a criterion of D or more was judged to be satisfactory.

<Evaluation of Member Contamination>

An image having a print percentage of 1.0% was printed out on 14,000 sheets of A4 paper in a lateral direction under a low-temperature and low-humidity (L/L) (10° C./15% RH) environment in the same manner as in the cleaning property evaluation. After the output on the 14,000 sheets, a halftone image having a toner laid-on level of 0.25 mg/cm$^2$ was output on the image-receiving paper. The densities of a central portion, and left and right end portions (positions distant from paper ends by 30 mm each) in the halftone image were measured, and a difference between the densities was calculated, followed by an evaluation based on the following criteria.

It has been known that when a charging member is contaminated, charging unevenness occurs on a photosensitive member to cause the density unevenness of the halftone image.

CS-680 (sold by Canon Marketing Japan Inc., basis weight: 68 g/m$^2$) was used as the image-receiving paper. A color reflection densitometer X-RITE 404A (manufactured by X-Rite Inc.) was used in the image density measurement, and a density relative to a printed-out image in a white ground portion having an original density of 0.00 was measured, followed by the calculation of the difference in density between the central portion of the image and each of the end portions thereof.

A: The density difference of the halftone image after the endurance evaluation is less than 0.03.

B: The density difference of the halftone image after the endurance evaluation is 0.03 or more and less than 0.05.

C: The density difference of the halftone image after the endurance evaluation is 0.05 or more and less than 0.10.

D: The density difference of the halftone image after the endurance evaluation is 0.10 or more.

In the present invention, a criterion of C or more was judged to be satisfactory.

Examples 1 to 22 and Comparative Examples 1 to 5

The respective toners shown in Table 3, the toners having, on the surfaces of their toner particles, the respective fine particles shown in Tables 1 and 2, were each evaluated for its cleaning properties at the initial stage and after the endurance evaluation, low-temperature fixability, and member contamination. The results are shown in Table 4.

TABLE 4

| | Toner | Cleaning property Initial stage | Cleaning property After endurance | Low-temperature fixability | Member contamination |
|---|---|---|---|---|---|
| Example 1 | Toner 1 | A | A | A | A |
| Example 2 | Toner 2 | A | A | A | A |
| Example 3 | Toner 3 | A | A | B | A |
| Example 4 | Toner 4 | A | A | C | A |
| Example 5 | Toner 5 | A | A | A | A |
| Example 6 | Toner 6 | B | B | A | A |
| Example 7 | Toner 7 | C | C | A | A |
| Example 8 | Toner 8 | A | B | C | A |
| Example 9 | Toner 9 | A | B | C | B |
| Example 10 | Toner 10 | A | B | D | B |
| Example 11 | Toner 11 | A | B | D | C |
| Example 12 | Toner 12 | A | C | D | C |
| Example 13 | Toner 13 | A | A | A | A |
| Example 14 | Toner 14 | B | B | B | A |
| Example 15 | Toner 15 | C | C | B | A |
| Example 16 | Toner 16 | B | B | D | A |
| Example 17 | Toner 17 | A | A | A | A |
| Example 18 | Toner 18 | B | C | D | A |
| Example 19 | Toner 19 | B | C | D | A |
| Example 20 | Toner 20 | C | c | B | A |
| Example 21 | Toner 21 | B | c | D | A |
| Example 22 | Toner 22 | A | A | A | A |
| Comparative Example 1 | Comparative Toner 1 | B | E | E | A |
| Comparative Example 2 | Comparative Toner 2 | B | D | B | B |
| Comparative Example 3 | Comparative Toner 3 | D | D | A | A |
| Comparative Example 4 | Comparative Toner 4 | A | A | E | A |
| Comparative Example 5 | Comparative Toner 5 | B | B | E | A |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-175015, filed Oct. 16, 2020, which is hereby incorporated by reference herein in its entirety.

What is claimed is:

1. A toner, comprising:
a toner particle containing a binder resin and a colorant; and
a fine particle on a surface of the toner particle, the fine particle being a solid having a substantially hemispherical shape with a substantially flat surface and a curved surface, a number-average value of a longest diameter "w" of the substantially flat surface being 10 to 400 nm, wherein
when at a time of observation of a section intersecting the substantially flat surface of the fine particle, a straight line that connects two points Pa and Pb of intersections of a line Lf and a line Lc is defined as an imaginary straight line Li, the line Lf being derived from the substantially flat surface, and the line Lc being derived from the curved surface,
in a straight line Ls1 vertically intersecting the imaginary straight line Li, such a distance that one of distances Da and Db that becomes maximum is defined as a maximum height "h", the distance Da being a distance between a point Pc and a point Pe, the point Pc being a point of intersection of the imaginary straight line Li and the straight line Ls1, a point Pe being a point of intersection of the line Lc and the straight line Ls1, the distance Db being a distance between a point Pd and the point Pe, and the point Pd being a point of intersection of the line Lf and the straight line Ls1, and
in a straight line Ls2 parallel to the imaginary straight line Li, such a distance Dc that becomes maximum is defined as a maximum width "b", the distance Dc being a distance between two points Pf and Pg of intersection of the straight line Ls2 and the line Lc, and
a number-average value of a ratio h/b of the maximum height "h" to the maximum width "b" is 0.33 to 0.80.

2. The toner according to claim 1, wherein the substantially flat surface of the fine particle is observed when the surface of the toner particle is observed.

3. The toner according to claim 1, wherein the fine particle includes at least one structure selected from the group consisting of formula (D), formula (T) and formula (Q)

$$(Ra)(Rb)Si(O_{1/2})_2 \quad \text{Formula (D)}$$

$$Rc\text{---}Si(O_{1/2})_3 \quad \text{Formula (T)}$$

$$Si(O_{1/2})_4 \quad \text{Formula (Q)}$$

where Ra, Rb and Rc independently represent an organic group bonded to silicon.

4. The toner according to claim 1, wherein the toner comprises 0.1 part by mass or more of the fine particle on the surface of the toner particle.

5. An external additive for a toner, comprising a solid having a substantially hemispherical shape with a substantially flat surface and a curved surface, a number-average value of a longest diameter "w" of the substantially flat surface being 10 to 400 nm, wherein
when at a time of observation of a section intersecting the substantially flat surface of the external additive for a toner, a straight line that connects two points Pa and Pb of intersections of a line Lf and a line Lc is defined as an imaginary straight line Li, the line Lf being derived from the substantially flat surface, and the line Lc being derived from the curved surface,
in a straight line Ls1 vertically intersecting the imaginary straight line Li, such a distance that one of distances Da and Db that becomes maximum is defined as a maximum height "h", the distance Da being a distance between a point Pc and a point Pe, the point Pc being a point of intersection of the imaginary straight line Li and the straight line Ls1, a point Pe being a point of intersection of the line Lc and the straight line Ls1, the distance Db being a distance between a point Pd and the point Pe, and the point Pd being a point of intersection of the line Lf and the straight line Ls1, and
in a straight line Ls2 parallel to the imaginary straight line Li, such a distance Dc that becomes maximum is defined as a maximum width "b", the distance Dc being a distance between two points Pf and Pg of intersection of the straight line Ls2 and the line Lc, and
a number-average value of a ratio h/b of the maximum height "h" to the maximum width "b" is 0.33 to 0.80.

6. The external additive for a toner according to claim 5, wherein the external additive for a toner includes at least one structure selected from the group consisting of formula (D), formula (T) and formula (Q)

$$(R_a)(R_b)Si(O_{1/2})_2 \quad \text{Formula (D)}$$

$$R_c\text{—}Si(O_{1/2})_3 \quad \text{Formula (T)}$$

$$Si(O_{1/2})_4 \quad \text{Formula (Q)}$$

where Ra, Rb, and Rc independently represent an organic group bonded to silicon.

7. A fine particle, comprising a solid having a substantially hemispherical shape with a substantially flat surface and a curved surface, a number-average value of a longest diameter "w" of the substantially flat surface being 10 to 400 nm, wherein
when at a time of observation of a section intersecting the substantially flat surface of the fine particle, a straight line that connects two points Pa and Pb of intersections of a line Lf and a line Lc is defined as an imaginary straight line Li, the line Lf being derived from the substantially flat surface, and the line Lc being derived from the curved surface,
in a straight line Ls1 vertically intersecting the imaginary straight line Li, such a distance that one of distances Da and Db that becomes maximum is defined as a maximum height "h", the distance Da being a distance between a point Pc and a point Pe, the point Pc being a point of intersection of the imaginary straight line Li and the straight line Ls1, a point Pe being a point of intersection of the line Lc and the straight line Ls1, the distance Db being a distance between a point Pd and the point Pe, and the point Pd being a point of intersection of the line Lf and the straight line Ls1, and
in a straight line Ls2 parallel to the imaginary straight line Li, such a distance Dc that becomes maximum is defined as a maximum width "b", the distance Dc being a distance between two points Pf and Pg of intersection of the straight line Ls2 and the line Lc,
a number-average value of a ratio h/b of the maximum height "h" to the maximum width "b" is 0.33 to 0.80.

8. The fine particle according to claim 7, wherein the fine particle includes at least one structure selected from the group consisting of formula (D), formula (T) and formula (Q)

$$(R_a)(R_b)Si(O_{1/2})_2 \quad \text{Formula (D)}$$

$$R_c\text{—}Si(O_{1/2})_3 \quad \text{Formula (T)}$$

$$Si(O_{1/2})_4 \quad \text{Formula (Q)}$$

where Ra, Rb, and Rc independently represent an organic group bonded to silicon.

* * * * *